US00RE37717E

(19) United States
(12) Reissued Patent
Eguchi et al.

(10) Patent Number: US RE37,717 E
(45) Date of Reissued Patent: May 28, 2002

(54) OPTICAL PICKUP DEVICE

(75) Inventors: Naoya Eguchi; Shigeo Kubota, both of Tokyo (JP)

(73) Assignee: Sony Corporation, Tokyo (JP)

(21) Appl. No.: 09/556,129

(22) Filed: Apr. 20, 2000

Related U.S. Patent Documents

Reissue of:
(64) Patent No.: 5,742,437
Issued: Apr. 21, 1998
Appl. No.: 08/555,339
Filed: Nov. 8, 1995

(30) Foreign Application Priority Data

Nov. 11, 1994 (JP) ..... 6-277400

(51) Int. Cl.[7] ..... G02B 9/00
(52) U.S. Cl. ..... 359/739; 359/721; 369/44.12; 250/201.5
(58) Field of Search ..... 359/739, 719, 359/721, 738; 369/44.23, 44.24, 44.12; 250/201.5

(56) References Cited

U.S. PATENT DOCUMENTS 4,124,273 A * 11/1978 Huignard et al. ..... 359/319
4,383,170 A * 5/1983 Takagi et al. ..... 250/216
4,927,241 A * 5/1990 Kuijk ..... 349/193
4,931,830 A * 6/1990 Suwa et al. ..... 355/71
5,058,091 A * 10/1991 Murao et al. ..... 369/44.21
5,071,229 A * 12/1991 Oaki et al. ..... 349/200
5,281,797 A * 1/1994 Tatsuno et al. ..... 250/201.5
5,392,263 A * 2/1995 Watanabe ..... 369/13
5,419,757 A * 5/1995 Luecke et al. ..... 369/44.23

FOREIGN PATENT DOCUMENTS

JP 06-295467 A * 10/1994

* cited by examiner

*Primary Examiner*—Ricky Mack
*Assistant Examiner*—Evelyn A. Lester
(74) *Attorney, Agent, or Firm*—Ronald P. Kananen, Esq.; Rader, Fishman & Grauer, PLLC

(57) ABSTRACT

An optical pickup device for condensing the light from a light source on a signal recording surface by an objective lens and for detecting the return light from the signal recording surface by a light detection unit is disclosed. The optical pickup device is capable of recording and/or reproducing at least two different sorts of optical recording media. The light beam radiated from a light source is condensed by an objective lens. An aperture varying unit varies the size of an aperture of the objective lens depending upon the sorts of the optical recording media. The return light from the optical recording medium is detected by a light detection unit. The size of the aperture of the objective lens for condensing the light from the light source is varied depending upon the difference in substrate thickness of the different sorts of the optical recording media, thus assuring high-quality recording/reproduction for two or more different sorts of optical recording media.

15 Claims, 20 Drawing Sheets

ABERRATION FOR
t1 = 0.6mm AND NA = 0.6

ABERRATION FOR
$t_2$ = 1.2mm AND·NA0 = 0.33 0.042rmsλ

OPTICAL PICKUP DEVICE

Matter enclosed in heavy brackets [ ] appears in the original patent but forms no part of this reissue specification; matter printed in italics indicates the additions made by reissue.

BACKGROUND OF THE INVENTION

This invention relates to an optical pickup device for condensing the light from a light source on a signal recording surface by an objective lens and for detecting the return light from the signal recording surface by light detection means.

For recording/reproducing optical or magneto-optical signals on or from an optical recording medium, such as an optical disc or a magneto-optical disc, an optical pickup device, which radiates a laser light beam to the optical recording medium and detects a return light beam therefrom, is employed.

The general construction of the optical pickup device is shown for example in JP Patent Kokai Publication JP-A-54-39101 (1979), shown herein in FIG. 1. This conventional optical pickup device is so constructed that a laser light beam from a laser diode 71 is condensed by an objective lens [71] *73* on a signal recording surface of an optical disc 74 and a return light therefrom is detected by a photodetector 75 to produce a servo signal and an RF signal. Thus the optical pickup device is of a simplified design of a finite multiplication factor which has omitted the collimator lens. In particular, the optical pickup device includes a beam splitter 72 disposed obliquely between the objective lens 73 and the photodetector 75.

With the present optical pickup device, part of the laser light radiated from the laser diode 71 is reflected by the surface of the beam splitter 72, obliquely arranged between the objective lens 73 and the photodetector 75, so as to be directed to the objective lens 73. The objective lens 73 condenses the laser light to radiate it on the signal recording surface of the optical disc 74.

The return light reflected by the signal recording surface on the optical disc 74 again reaches the beam splitter 72 via the objective lens 73. The beam splitter 72 permits part of the return light to be passed therethrough to fall on the photodetector 75.

With recent increase in the volume of information, the optical recording medium, as the package medium of the music or picture information, such as a recording device for a computer, compact disc or a video disc, have become promulgated extensively, while the tendency is also towards recording with higher recording density.

Among the methods for achieving such high density recording, it may also be contemplated to increase the numerical aperture (NA) of the objective lens so as to be larger than that used in an optical pickup device employed in, e.g., a conventional compact disc player. If NA is increased, the beam spot formed on the compact disc is reduced in size, thus leading to improved resolution and higher recording density. However, if NA is increased, the tolerance for disc tilt is diminished.

For example, the optical disc reproducing device reproduces signals recorded on the reflective surface, that is the signal recording surface, via a transparent substrate having a thickness on the order of 1.2 mm. Thus, should the disc be tilted with respect to the optical axis of the objective lens, the third-order coma aberration, generated in proportion to approximately a third power of the numerical aperture NA and approximately a first power of a skew θ, becomes dominant. The generated wavefront surface W is given by $$W(x, y)=W_{31}x(x^2+y^2) \tag{1}$$

On the other hand, the Seidel's third-order coma aberration coefficient $W_{31}$ becomes $$W_{31} = \frac{n^2-1}{2n^2} t\theta NA^3/\lambda \tag{2}$$

because θ is sufficiently small. The unit is standardized by the wavelength λ.

In the above equations, t denotes a thickness of the disc substrate, n denotes a refractive index of the disc substrate, θ denotes the quantity of disc skew, and NA is the numerical aperture NA of the objective lens.

In a system having the numerical aperture NA of, e.g., 0.6, which is as much as 1.33 times the numerical aperture NA of 0.45 of an objective lens employed in an optical pickup device of a conventional optical pickup device, a coma aberration of about 3.5 times as much as that produced with a conventional system is produced for the disc skew which is of the same magnitude as that of the conventional compact disc.

For example, if a disc having a disc skew as large as ±0.5 to 1°, such as a disc having a polycarbonate substrate produced inexpensively in large quantities, is employed, the [spots] *spot* formed on the disc becomes non-symmetrical due to such wavefront distortion, thus increasing inter-symbol interference, such that waveform distortion in the reproduced signal becomes significant and hence the signal cannot be extracted sufficiently.

Thus it may be contemplated to reduce the thickness t of the disc substrate from, e.g., 1.2 mm to, e.g., 0.6 mm, that is to a one-half value, for reducing the third-order coma aberration coefficient $W_{31}$ to a one-half value.

Meanwhile, if the disc substrate is of a small thickness, as described above, and a pre-existing optical recording medium, such as a write-once optical disc, phase-change optical disc or a magneto-optical disc, is reproduced using an optimized objective lens, RF signals of excellent signal quality cannot be reproduced due to the difference in substrate thicknesses.

It is known in general that the amount of fourth-order spherical aberration, standardized with the wavelength generated with parallel flat plates in the converging light beam, is proportional to the fourth power of the numerical aperture NA of the objective lens and proportional to a reciprocal of the wavelength. On the other hand, the wavefront W is given by $$W(x, y)=W_{40}(x^2+y^2)^2 \tag{3}$$

The Seidel's fourth-order spherical aberration coefficient $W_{40}$ is given by $$W_{40} = \frac{n^2-1}{n^3}\frac{t}{8}NA^4/\lambda \tag{4}$$

where t and n denote the thickness and the refractive index of the substrate, respectively.

Thus, if a compact disc having a substrate thickness t=1.2 mm is reproduced using an objective lens of a numerical aperture of 0.6, optimized for the substrate thickness t=0.6 mm, the amount of the generated spherical aberration reaches a larger value of 3.6 μm in terms of the Seidel's fourth-order aberration coefficient $W_{40}$. The root mean square sum of the aberration of the optical system in this case is 0.268 rmsμm. For comparison, root mean square sum values for the wavelength λ of 0.532 μm and for the wavelength λ of 0.68 μm are 0.5 rmsλ and 0.4 rmsλ., respectively.

It is generally required of the optical disc that the root mean square sum of the aberration of a given optical system be not more than 0.07 rmsλ in terms of the Marechal criterion. Thus, such a system in which the root mean square sum ascribable only to the disc substrate amounts to as much as 0.4 rmsλ to 0.5 rmsλ is not acceptable.

That is, if two or more sorts of the optical disc having different disc substrate thicknesses are to be reproduced, playback signals of high signal quality cannot be obtained with a disc having a substrate thickness for which the objective lens is not optimized.

OBJECT AND SUMMARY OF THE INVENTION

It is therefore an object of the present invention to provide an optical pickup device whereby high-quality recording/reproduction may be achieved even with two or more different optical recording media.

With the optical pickup device according to the present invention, the size of the aperture of the objective lens for condensing the light from a light source is varied depending upon the sorts of the optical discs in order to enable recording and/or reproduction of at least two different sorts of optical recording media.

With the above optical recording medium, it is possible for the aperture varying means to set a numerical aperture NA of the objective lens with respect to the optical recording medium having a substrate thickness of 0.6 mm to 0.6 as well as to set a numerical aperture $NA_o$ of the objective lens with respect to the optical recording medium having a substrate thickness of 1.2 mm to not more than $(0.45/0.78)\times\lambda_o$, where $\lambda_o$ denotes a numerical value equal to the wavelength of light radiated by the light source.

The aperture varying means for varying the size of the aperture of the objective lens depending upon the sorts of the optical recording medium may be arranged between the objective lens and the light source or between the objective lens and the optical recording medium. Alternatively, the aperture varying means may be arranged on the surface [of] *or* within the inside of the objective lens.

The aperture varying means may also vary the aperture of the objective lens depending upon the substrate thickness of at least two different sorts of the optical recording media. The aperture varying means may also vary the aperture size by rotating respective blades of a light stop mechanism having the plural blades.

The aperture varying means may also vary the aperture size using a liquid crystal shutter or by moving [of] *or* rotating a plate having plural openings for changing over the openings.

With the optical pickup device according to the present invention, since the size of the aperture of the objective lens for condensing the light from a light source is varied depending upon the difference in substrate thickness of the different sorts of the optical recording media by aperture varying means, high-quality recording/reproduction may be realized for disc-shaped recording media of two or more different sorts.

DESCRIPTION OF PREFERRED EMBODIMENTS

Figure 1:
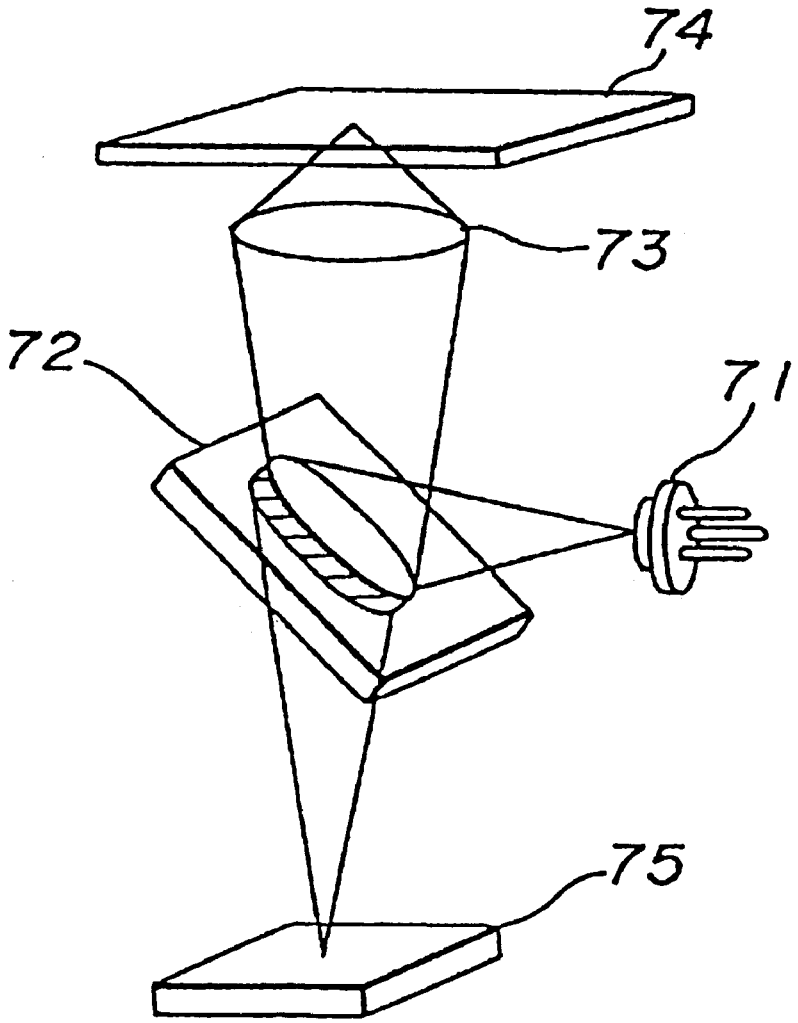
FIG.1 (PRIOR ART)
FIG. 1 is a schematic view showing a conventional optical pickup device.

Referring to the drawings, preferred embodiments of the optical pickup device according to the present invention will be explained in detail.

Figure 2:
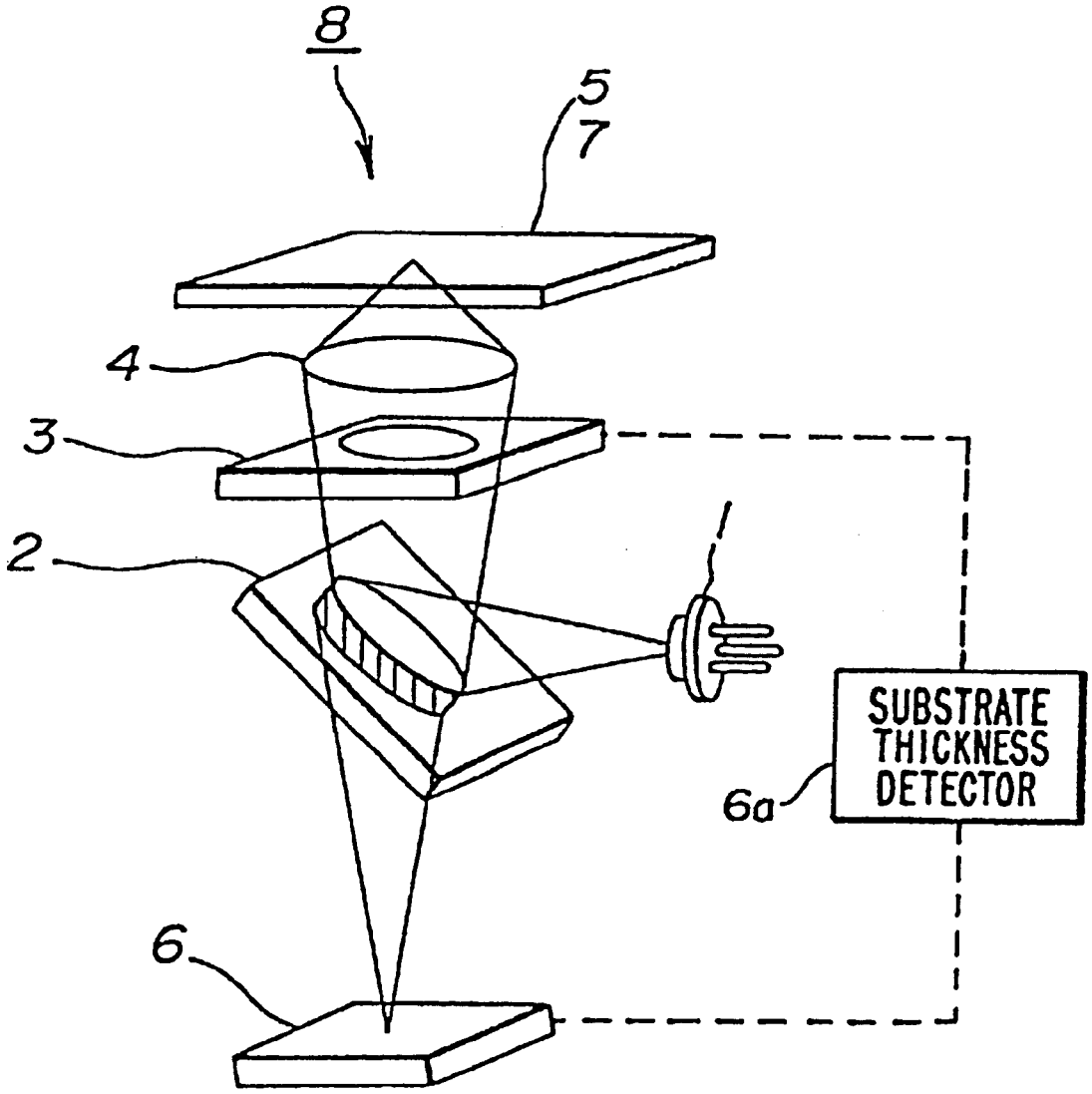
FIG. 2 is a schematic view of an optical pickup device according to a first embodiment of the present invention.

The optical pickup device of the first embodiment of the present invention is explained. The present first embodiment is directed to an optical pickup device 8 configured for reproducing information signals from an optical disc 5 with a substrate thickness of 0.6 mm and an optical disc 7 with a substrate thickness of 1.2 mm, as shown in FIG. 2. The optical pickup device includes a laser diode 1 for radiating the playback laser light to the optical discs 5 and 7 and an objective lens 4 for condensing the playback laser light from the laser light 1 on the signal recording surfaces (information surfaces) of the optical discs 5 and 7. The optical pickup device also includes an aperture varying mechanism 3 for setting the numerical aperture NA of the objective lens 4 for the optical disc 5 with the substrate thickness of 0.6 mm to 0.6 and that for the optical disc 7 with the substrate thickness of 1.2 mm to 0.4, and a photodetector 6 for detecting the return light from the optical discs 5, 7. The aperture varying mechanism 3 is arranged between the objective lens 4 and the laser diode 1.

The optical pickup device 8 causes part of the laser light radiated from the laser diode 1 to be reflected by a beam splitter 2 so as to be condensed on the signal recording surfaces of the optical discs 5 and 7 via the aperture varying mechanism 3 and the objective lens 4. The return light from the signal recording surfaces of the optical discs 5 and 7 is incident via the aperture varying mechanism 3 on the beam splitter 2. Part of the return light is transmitted through the beam splitter 2 so as to fall on the photodetector 6. The photodetector 6 converts the volume of the return light into electrical signals. Thus, with the present first embodiment, servo signals and RF signals are produced. Meanwhile, the optical pickup device 8 of the present first embodiment is of a simplified construction of a finite multiplication factor not having a collimator lens.

The outgoing laser light from the laser diode 1, reflected by the beam splitter 2, is incident on the objective lens 4 via the aperture varying mechanism 3. The aperture varying mechanism 3, arranged between the objective lens 4 and the laser diode 1, represents aperture varying means whereby the aperture size may be changed depending upon the substrate thickness of the optical disc 5 or 7. In effect, the aperture varying mechanism 3 varies the numerical aperture of the objective lens 4.

It is possible with the present optical pickup device 8 to judge the difference in the substrate thickness of 0.6 mm and 1.2 mm of the optical discs 5 and 7 by substrate thickness detection means 6a, as shown in FIG. 2. Among substrate thickness detection means, there are such means for mechanically, optically or magnetically detecting whether or not the optical disc is housed within the cartridge main body portion, means for detecting the information on the substrate thicknesses, recorded on the optical disc by, e.g., bar codes, using light sources, such as laser diodes, LEDs or lamps, and means (e.g., as depicted in FIG. 2) for detecting the difference in substrate thickness using RF or servo signals detected by the photodetector 6.

Figure 3:
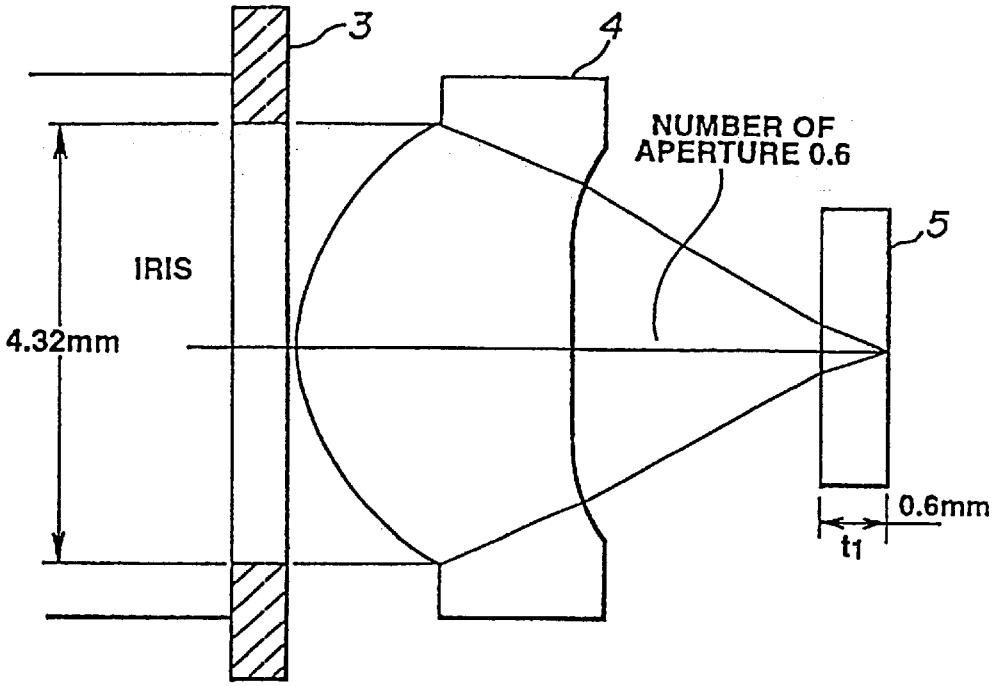
FIG. 3 illustrates reproduction of information signals from a disc having a disc substrate thickness of 0.6 mm by the optical pickup device shown in FIG. 2.
Figure 4:
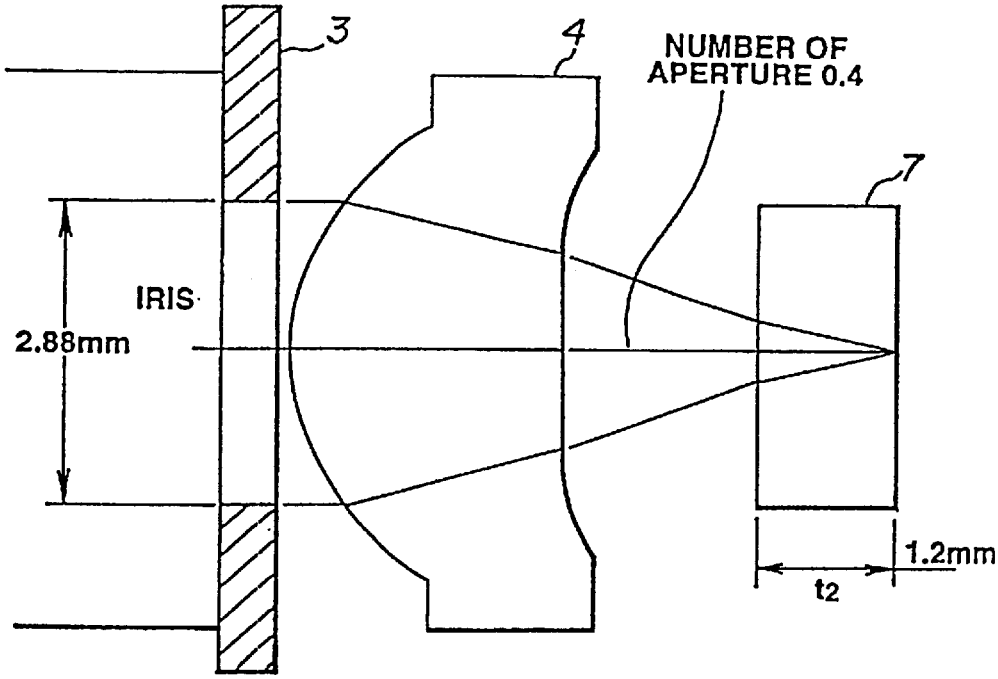
FIG. 4 illustrates reproduction of information signals from a disc having a disc substrate thickness of 1.2 mm by the optical pickup device shown in FIG. 2.

The operating principle of the optical pickup device 8 is explained by referring to FIGS. 3 and 4.

For reproducing information signals from the optical disc 5 with a substrate thickness $t_1$ of 0.6 mm, the light stop of the aperture varying mechanism 3 and the aperture diameter of the objective lens 4 are set to 4.32 mm and to 4.32, respectively, for setting the numerical aperture of the objective lens 4 to 0.6. On the other hand, for reproducing information signals from the optical disc 7 with a substrate thickness $t_2$ of 1.2 mm, the light stop of the aperture varying mechanism 3 and the aperture diameter of the objective lens 4 are set to 2.88 mm and to 2.88, respectively, for setting the numerical aperture of the objective lens 4 to 0.4. At this time, the laser light having the wavelength of 680 mm is radiated from the laser diode 1 so that the focal length will be 3.6 mm.

Figure 5A:
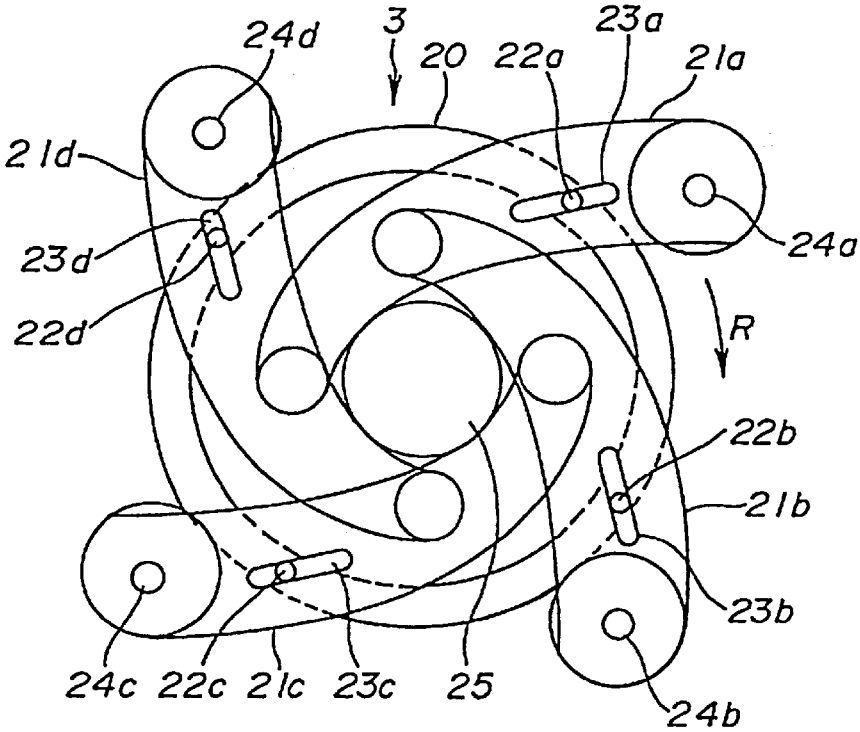
FIGS. 5A and 5B illustrate an aperture varying mechanism for varying the size of the aperture by rotating plural blades.
Figure 5B:
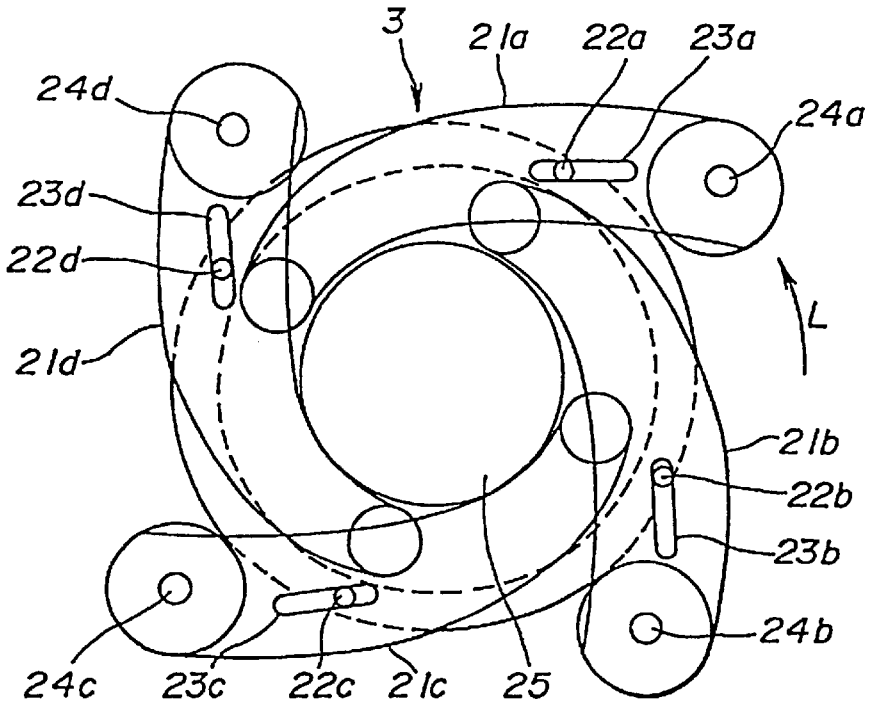

The aperture varying mechanism 3 is such a mechanism in which plural blades 21a, 21b, 21c and 21d of the light stop mechanism are rotated for varying the light stop for varying the size of the aperture 25, as shown in FIGS. 5A and 5B. For reducing the aperture 25, a rotary unit 20 is turned in a direction of arrow R so that pins 22a, 22b, 22c and 22d will be moved in the direction of arrow R, as shown in FIG. 5A. The blades 21a, 21b, 21c and 21d, whose elongated openings 23a, 23b, 23c and 23d are engaged by the pins 22a, 22b, 22c and 22d, are supported at one ends thereof by supporting portions 24a, 24b, 24c and 24d, so that the blades 21a to 21d have opposite ends thereof directed towards the inner periphery of the aperture varying mechanism 3. Thus the aperture 25 is reduced in diameter.

For enlarging the aperture 25, the rotary unit 20 is rotated in a direction of arrow L in FIG. 5B. The blades 21a, 21b, 21c and 21d have their opposite ends directed towards the outer periphery of the aperture varying mechanism 3. Thus the aperture 25 is enlarged in diameter.

Evaluation of the operation of the optical pickup device 8 is done with the Marechal criterion of 0.07 rms$\lambda$ as a reference.

In general, the non-spherical shape z of the objective is given by $$z = \frac{(\mathrm{CURV})h^2}{1+\sqrt{1-(1+k)(\mathrm{CURV})^2h^2}} + Ah^2 + Bh^6 + Ch^8 + Dh^{10} \quad (5)$$

where CURV denotes the radius of curvature of the inscribed non-spherical surface, k denotes the constant of a conus, A denotes the fourth-order non-spherical coefficient, B denotes the sixth-order non-spherical coefficient, C denotes the eighth-order non-spherical coefficient and D denotes the tenth-order non-spherical coefficient.

The objective lens 4 has the following lens dimensions. The lens dimensions are given in the order of the radius of curvature, spacing and the refractive index according to respective planes. The radius of curvature and the spacing of the object plane are both infinite ($\infty$).

The radius of curvature, spacing and the refractive index of the first plane are 2.40336, 2.460000 and 1.585352, respectively. The non-spherical coefficients of the first plane shown in the equation (5) are k=−0.1116645, A=−0.175589E−03, B=0.371319E−04, C=0.000000E+00 and D=0.000000E+00.

The radius of curvature and the spacing of the second plane are −0.10.64036 and 2.155501, respectively. The non-spherical coefficients of the second plane shown in the equation (5) are k=−0.17298E09, A=0.213134E−01, B=0.128092E+00, C=0.000000E+00 and D=0.000000E00.

As to the lens design specifications, the numerical aperture NA is 0.60000, the wavelength is 680.00 nm, the focal lengths is 3.6, and an image height is 0.05000 mm, for the substrate thickness $t_1$=0.6 mm, whereas, for the substrate thickness $t_2$=1.2 mm, the numerical aperture NA is 0.4, the wavelength is 680.00 nm, the focal length is 3.6, and an image height is 0.05000 mm.

Figure 6A:
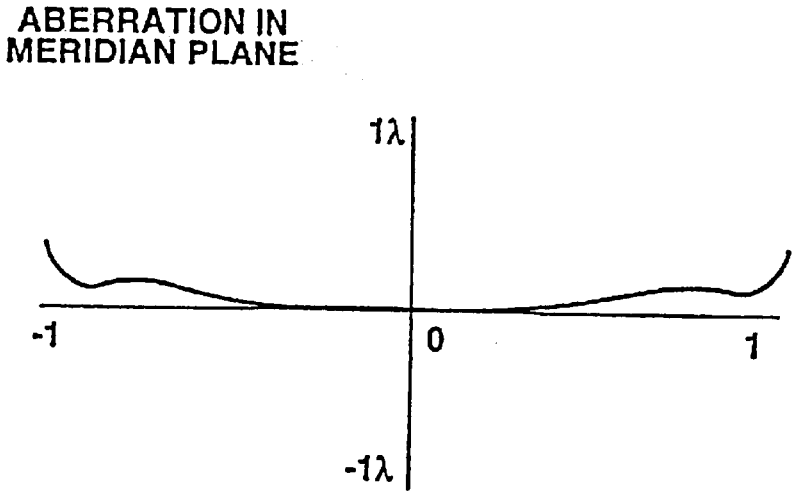
FIGS. 6A and 6B illustrate on-axis wavefront aberration in case of reproduction of information signals from a disc having a disc substrate thickness of 0.6 mm by the optical pickup device shown in FIG. 2.
Figure 6B:
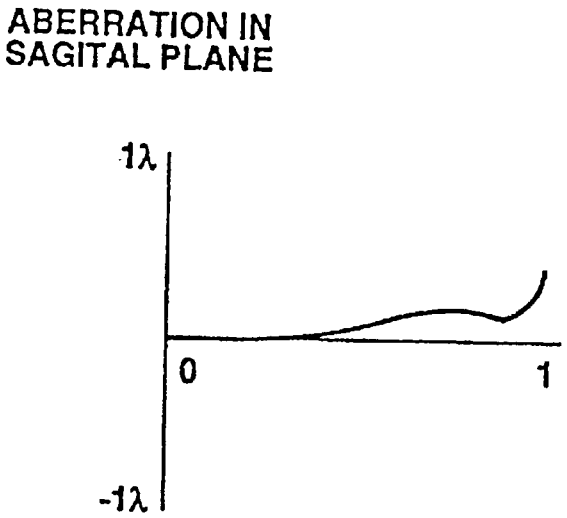
Figure 7A:
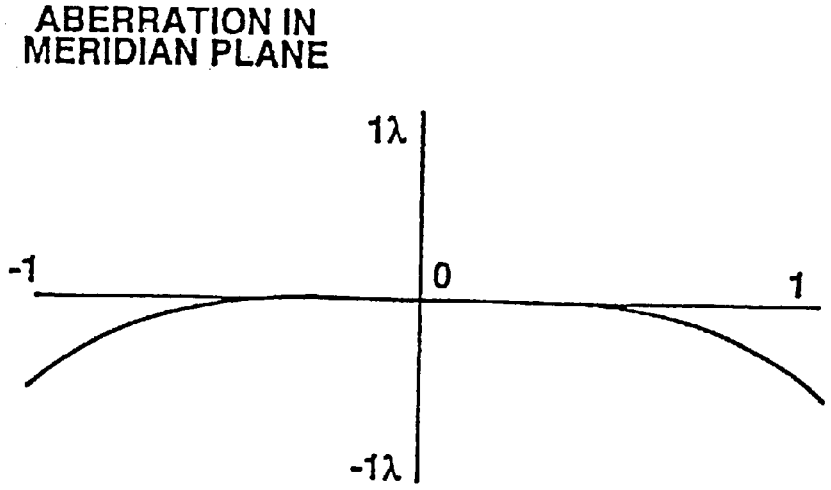
FIGS. 7A and 7B illustrate on-axis wavefront aberration in case of reproduction of information signals from a disc having a disc substrate thickness of 1.2 mm by the optical pickup device shown in FIG. 2.
Figure 7B:
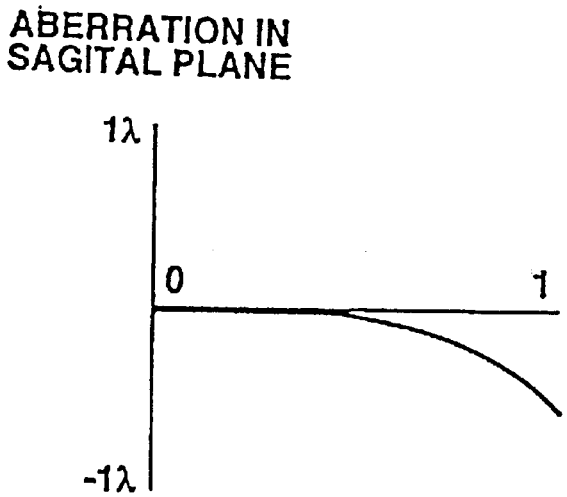

The on-axis wavefront aberration is shown in FIGS. 6A, 6B, 7A and 7B. FIG. 6A shows changes in the aberration in the meridinal image surface with respect to changes in the diameter of the pupil of the objective lens 4 for the disc substrate thickness $t_1$=0.6 mm and the numerical aperture of the objective lens of 0.6. FIG. 6B shows changes in the aberration in the sagittal image surface with respect to changes in diameter of the pupil of the objective lens 4. FIG. 7A shows changes in the aberration in the meridinal image surface with respect to changes in the diameter of the pupil of the objective lens 4 for the disc substrate thickness $t_2$=1.2 mm and the numerical aperture of the objective lens of 0.4. FIG. 7B shows changes in the aberration in the sagittal image surface with respect to changes in diameter of the pupil of the objective lens 4. The on-axis aberration of the optical system is 0.029 rmsλ and 0.043 rmsλ for the disc substrate thickness $t_1$=0.6 mm and the numerical aperture of the objective lens of 0.6 and for the disc substrate thickness $t_2$=1.2 mm and the numerical aperture of the objective lens of 0.4, respectively. In both of these cases, the Marechal criterion was not higher than 0.07 rmsλ. Thus, with the first illustrative example, high-quality reproduction may be achieved with the two sorts of the optical disc 5 of the disc substrate thickness $t_1$=0.6 mm and the optical disc 7 of the disc substrate thickness $t_2$=1.2 mm.

The aperture varying mechanism 3 of the optical pickup device 8 may be so designed that the numerical aperture NA of the objective lens 4 for the optical disc 5 with the substrate thickness of 0.6 mm is 0.6 and the numerical aperture $NA_o$ of the objective lens 4 for the optical disc 5 with the substrate thickness of 1.2 mm is not more than $(0.45/0.78)\times\lambda_o$, where $\lambda_o$ is a numerical value equal to the wavelength of the laser light radiated by the laser diode 1 in μm.

The value of 0.45 is the commonplace value of the numerical aperture of the objective lens employed for recording/reproduction of the optical recording medium having the substrate thickness of 1.2 mm, such as a compact disc, while the value of 0.78 is the value for the wavelength of light from the light source employed on this occasion.

Since the aperture varying mechanism 3 is such a mechanism which gives the numerical aperture $NA_o$ of the objective lens 4 equal to not more than $(0.45/0.78)\times\lambda_o$, where $\lambda_o$ is a numerical value equal to the wavelength of the laser light radiated by the laser diode 1 in μm, for the optical disc 5 with the substrate thickness of 1.2 mm, as described above. Thus, if the wavelength λ of the laser light radiated from the laser diode 1 is, e.g., 0.635 μm, the numerical aperture $NA_o$ is not more than 0.366.

Figure 8:
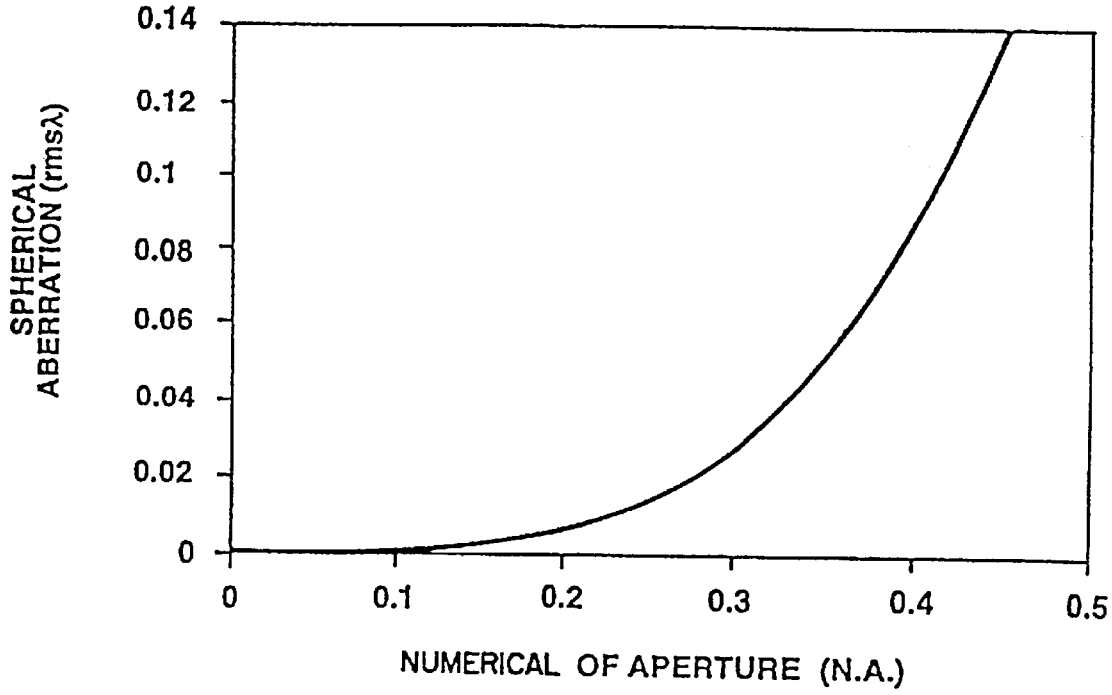
FIG. 8 is a graph showing the relation between the spherical aberration (rmsλ) and the numerical aperture (NA) in case of radiation of a laser light beam with the laser light wavelength λ of 0.635 μm to a cover glass with a substrate thickness of 1.2 mm using an objective lens optimized for the cover glass with a substrate thickness of 0.6 mm.

The relation between the spherical aberration (rmsλ) and the numerical aperture NA on radiating the laser light on a cover glass having the substrate thickness of 1.2 mm, using an objective lens optimized for the cover glass with the substrate thickness of 0.6 mm, with the laser light wavelength λ being 0.635 μm, is shown in FIG. 8. The spherical aberration is increased at this time approximately as a fourth power of the numerical aperture.

The commonplace cut-off frequency of the reproducing optical system for an optical disc, such as a compact disc, is 1153/mm. The numeral aperture for obtaining this cut-off frequency for the light source wavelength of 0.635 μm is 0.366. By simulation, values of the spherical aberration shown in Table 1:

| | 7λ = 635 nm | | | λ = 780 nm |
|---|---|---|---|---|
| NA | 0.30 | 0.33 | 0.36 | 0.45 |
| Skew° | 0.027 rmsλ | 0.040 rmsλ | 0.056 rmsλ | 0 rmsλ |
| Skew t1° | 0.029 rmsλ | 0.042 rmsλ | 0.059 rmsλ | 0.058 rmsλ |
| Skew r1° | 0.029 rmsλ | 0.042 rmsλ | 0.059 rmsλ | 0.058 rmsλ |

were obtained for the case of reproducing the optical disc with the values of the numerical aperture smaller than the above numerical value, for example, 0.30, 0.33 and 0.36. For each of these numerical apertures, three cases of skews, that is skew of 0°, tangential skew of 1° (specified t1°) and radial skew of [1'] *1°* (specified as [r°] *r1°*) were assumed. For comparison, Table 1 shows respective values of the spherical aberration for the above three skew values of the objective lens with the numerical aperture for the laser light with the light source wavelength of 780 μm. In Table 1, the same values of the spherical aberration were achieved before and after waveform evaluation of the eye diagram obtained by simulation.

That is, it is seen from Table 1 that, if the value of the numerical aperture is not more than 0.360, the respective values of the spherical aberration are not more than the Marechal criterion of 0.07 rmsλ, as in the case of the three values of the skew of the objective lens with the NA of 0.45 for the laser light of the light source wavelength of 780 nm.

Figure 9:
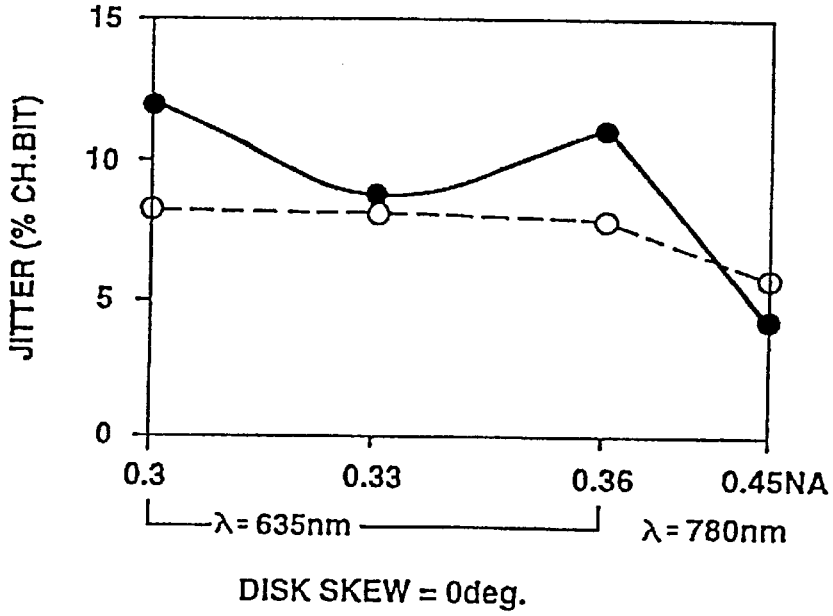
FIG. 9 is a graph showing changes in the amount of jitter for each of values of the numerical aperture of 0.30, 0.33 and 0.36, with the disc skew being 0°.

FIG. 9 shows changes in jitter for each value of the numeral apertures of 0.30, 0.33 and 0.36 for the disc skew of 0°. In FIG. 9, a solid line and broken line denote changes proper to jitter before and after waveform evaluation, respectively.

Figure 10:
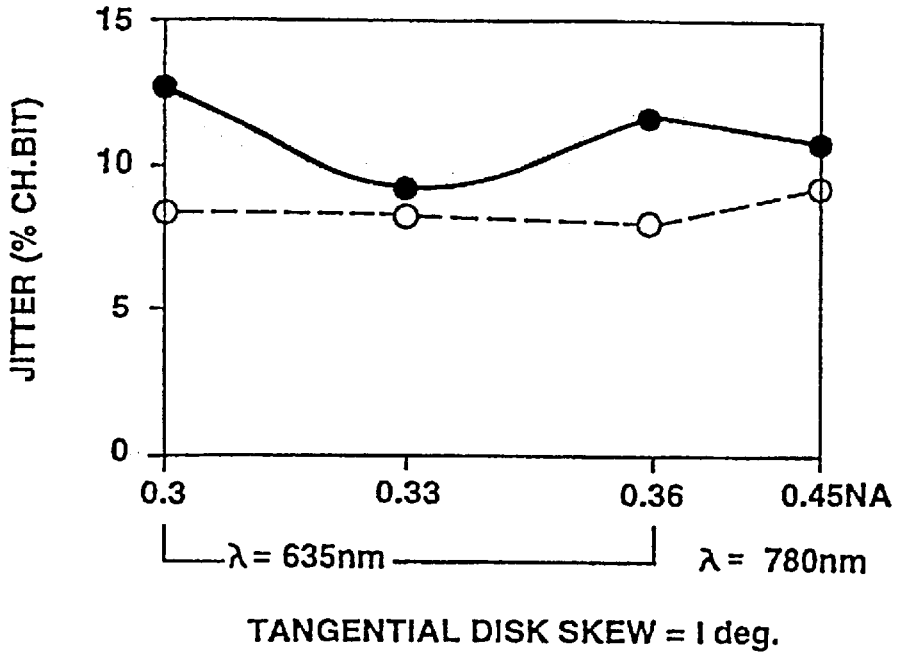
FIG. 10 is a graph showing changes in the amount of jitter for each of values of the numerical aperture of 0.30, 0.33 and 0.36, with the tangential disc skew being 1°.

FIG. 10 shows changes in jitter, having a high contribution factor as perturbation, for respective values of the numerical aperture of 0.30, 0.33 and 0.36 for the tangential disc skew of 1°. In FIG. 10, a solid line and a broken line denote changes proper to jitter before and after waveform evaluation, respectively.

Thus it is seen from FIGS. 9 and 10 that the jitter becomes minimal before and after waveform evaluation for the numerical aperture of 0.33, and that, if the values of the aberration shown in Table 1 are taken into account, the numerical aperture of 0.33 is most preferred for reproducing the optical disc with the substrate thickness of 1.2 mm.

This holds for any wavelength of the light source, including the light source wavelength of 0.635 μm. That is, the optical disc with the substrate thickness of 1.2 mm may be reproduced satisfactorily by setting the numerical aperture $NA_o$ of the objective lens so as to be not more than $(0.45/0.78)\times\lambda_o$.

Thus, if the wavelength λ is 0.65 μm and 0.68 μm, the numerical aperture $NA_o$ of not more than 0.375 and not more than 0.392 suffices, respectively. The optimum value of the numerical aperture may be searched after finding the spherical aberration and the jitter as described above.

Figure 11:
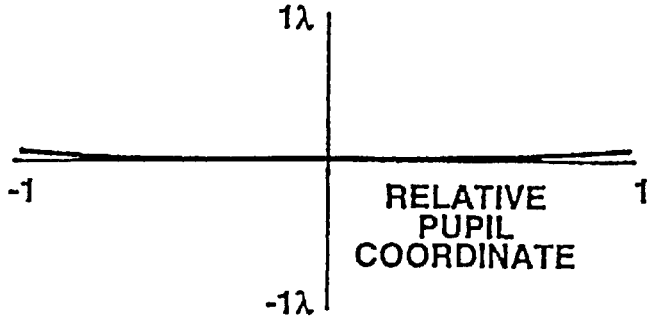
FIG. 11 is a graph showing changes in the amount of jitter for the numerical aperture NA=0.6 for the optical disc 5 with the substrate thickness $t_1$=0.6 mm.
Figure 12:
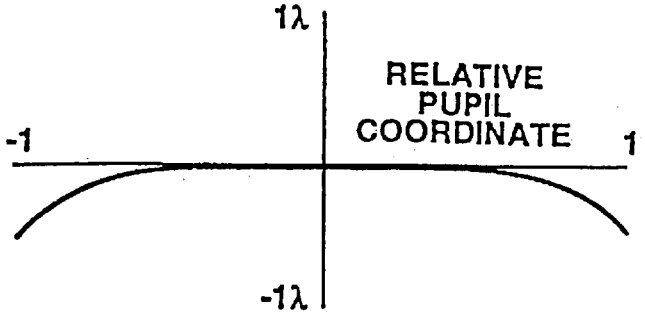
FIG. 12 is a graph showing changes in the amount of jitter for the numerical aperture $NA_0$=0.33 for the optical disc 7 with the substrate thickness $t_2$=1.2 mm.

FIGS. 11 and 12 show the on-axis wavefront aberration of the objective lens 4 of the optical pickup device 8 for the light source wavelength of 0.635 $\mu$m. FIGS. 11 and 12 show the aberration of the objective lens 4 with the numerical aperture NA of 0.6 for the optical disc 5 with the substrate thickness $t_1$=0.6 mm and aberration of the objective lens 4 with the numerical aperture $NA_o$ of 0.33 for the optical disc 7 with the substrate thickness $t_2$=1.2 mm, respectively.

For the optical disc 5 with the substrate thickness $t_1$=0.6 mm, the aberration of the optical system becomes 0.001 rms$\lambda$ for the numeral aperture NA of the objective lens 4 of 0.6, whereas, for the optical disc 5 with the substrate thickness $t_2$=1.2 mm, the aberration of the optical system becomes 0.042 rms$\lambda$ for the numerical aperture $NA_o$ of the objective lens 4 of 0.33. In both cases, the Marechal criterion was not more than 0.07 rms$\lambda$ with sufficient allowance.

Thus it is seen that the optical pickup device 8 having the aperture varying mechanism 3 which gives the numerical aperture $NA_o$ of the objective lens 4 of not more than $(0.45/0.78)\times\lambda_o$ for the optical disc 7 with the substrate thickness $t_2$=1.2 mm is capable of satisfactorily reproducing the optical disc with the substrate thickness $t_1$=0.6 mm and the optical disc with the substrate thickness $t_2$=1.2 mm.

Figure 13:
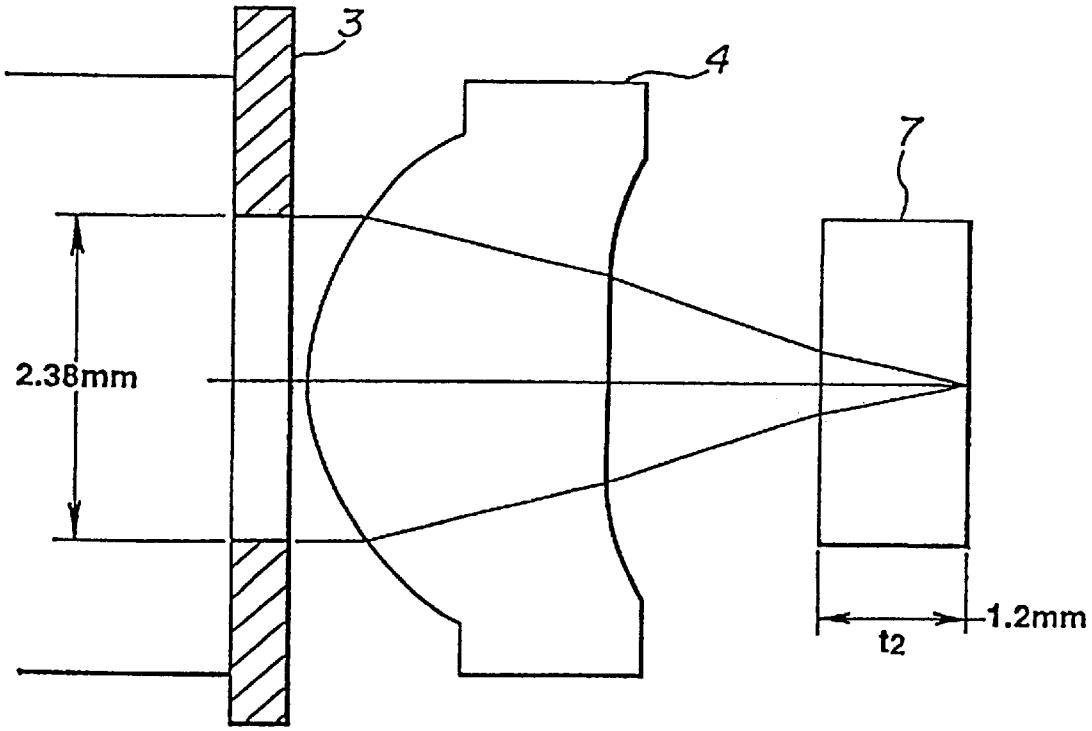
FIG. 13 is a schematic view illustrating light stop adjustment of the aperture varying mechanism for the numerical aperture of the objective lens 4 of 0.33.

If the optical pickup device 8 is to reproduce information signals from the optical disc 5 having the substrate thickness $t_1$ of 0.6 mm, the light stop of the aperture varying mechanism 3 is adjusted for setting the numerical aperture of the objective lens 4 to 0.6 mm by setting the aperture diameter of the objective lens 4 to 4.32 mm, as shown in FIG. 3. If the optical pickup device 8 is to reproduce information signals from the optical disc 7 having the substrate thickness $t_2$ of 1.2 mm, the light stop of the aperture varying mechanism 3 is adjusted for setting the aperture diameter of the objective lens 4 to 2.38 mm, for thereby setting the numerical aperture of the objective lens 4 to 0.33, as shown in FIG. 13. The objective lens 4 radiates the laser light from the laser diode 1 with the wavelength of 635 nm on the optical disc with the focal length of 3.6 mm.

Figure 14:
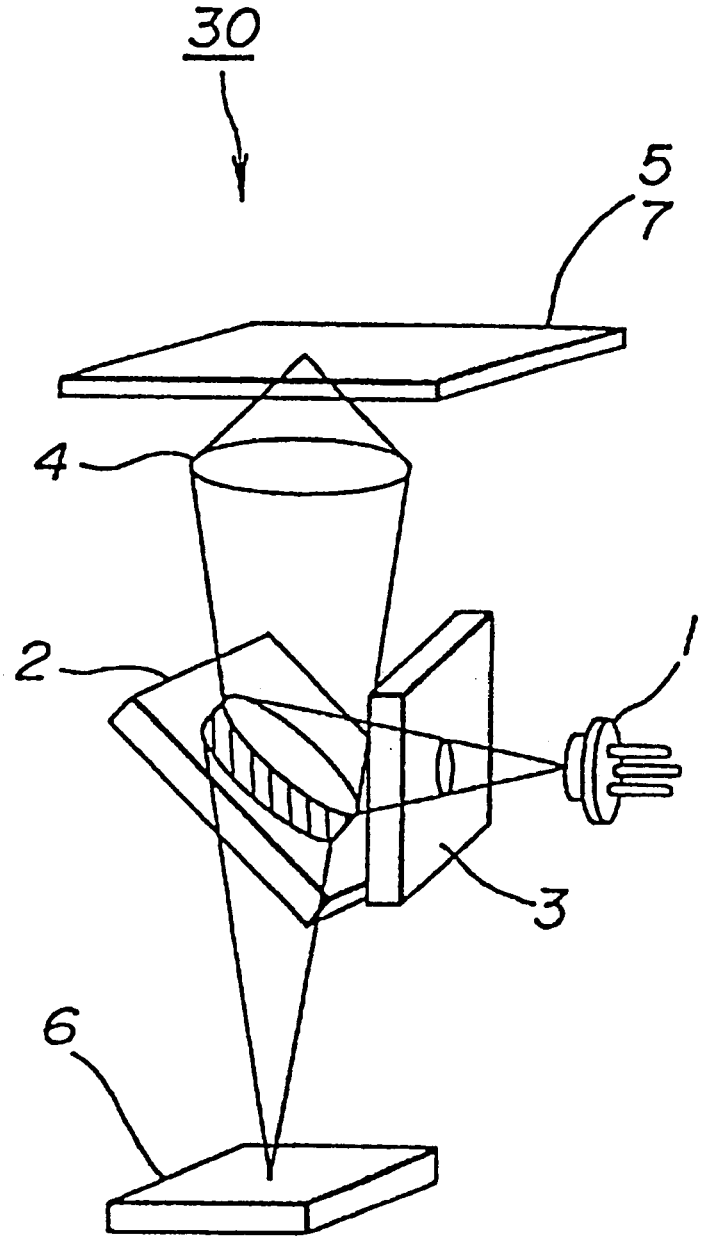
FIG. 14 is a schematic view of an optical pickup device according to a second embodiment of the present invention.

The second embodiment is explained by referring to FIG. 14. Similarly to the first embodiment for the optical pickup device 8, the present second embodiment is directed to an optical pickup device 30 configured for reproducing information signals from an optical disc 5 with a substrate thickness of 0.6 mm and an optical disc 7 with a substrate thickness of 1.2 mm.

That is, the optical pickup device includes a laser diode 1 for radiating the playback laser light to the optical discs 5 and 7 and an objective lens 4 for condensing the playback laser light from the laser light 1 on the signal recording surfaces (information surfaces) of the optical discs 5 and 7. The optical pickup device also includes an aperture varying mechanism 3 for setting the numerical aperture NA of the objective lens 4 for the optical disc 5 with the substrate thickness of 0.6 mm and the numerical aperture $NA_o$ of the objective lens 4 for the optical disc 7 with the substrate thickness of 1.2 mm to 0.6 and to $(0.45/0.78)\times\lambda_o$, respectively, where $\lambda_o$ denotes a numerical value equal to the wavelength of the laser light radiated from the laser diode 31 in $\mu$m, and a photodetector 6 for detecting the return light from the optical discs 5, 7. The aperture varying mechanism 3 is arranged between the laser diode 1 and the beam splitter 2.

The optical pickup device 30 causes part of the laser light radiated from the laser diode 1 and transmitted through the aperture varying mechanism 3 to be reflected by the beam splitter 2 so as to be condensed on the signal recording surfaces of the optical discs 5 and 7 via the objective lens 4. The return light from the signal recording surfaces of the optical discs 5 and 7 is incident via the aperture varying mechanism 3 on the beam splitter 2. Part of the return light is transmitted through the beam splitter 2 so as to fall on the photodetector 6. The photodetector 6 converts the volume of the return light into electrical signals. Thus, with the present first embodiment, servo signals and RF signals are produced. Meanwhile, the optical pickup device 8 of the present first embodiment is of a simplified construction of an infinite multiplication factor not having a collimator lens.

The aperture varying mechanism 3 arranged between the laser diode 1 and the beam splitter 2 is such an aperture varying means capable of changing the size of the aperture depending upon the substrate thickness of the optical discs 5 and 7 and consequently changing the numeral aperture of the objective lens 4.

Similarly to the optical pickup device of the first embodiment, the optical pickup device 30 is capable of discriminating the difference in the substrate thickness of the optical disc 5 with the substrate thickness of 0.6 mm and the optical disc 7 with the substrate thickness of 1.2 mm by substrate thickness detection means, not shown. The substrate thickness detection means is not explained in detail. The description of the operating principle and the detailed mechanism is also not made for simplicity.

With the optical pickup device 30 of the second embodiment, satisfactory reproduction may be expected from the optical disc 5 having the disc substrate thickness $t_1$=0.6 mm and the optical disc 7 having the substrate thickness $t_2$=1.2 mm.

Figure 15:
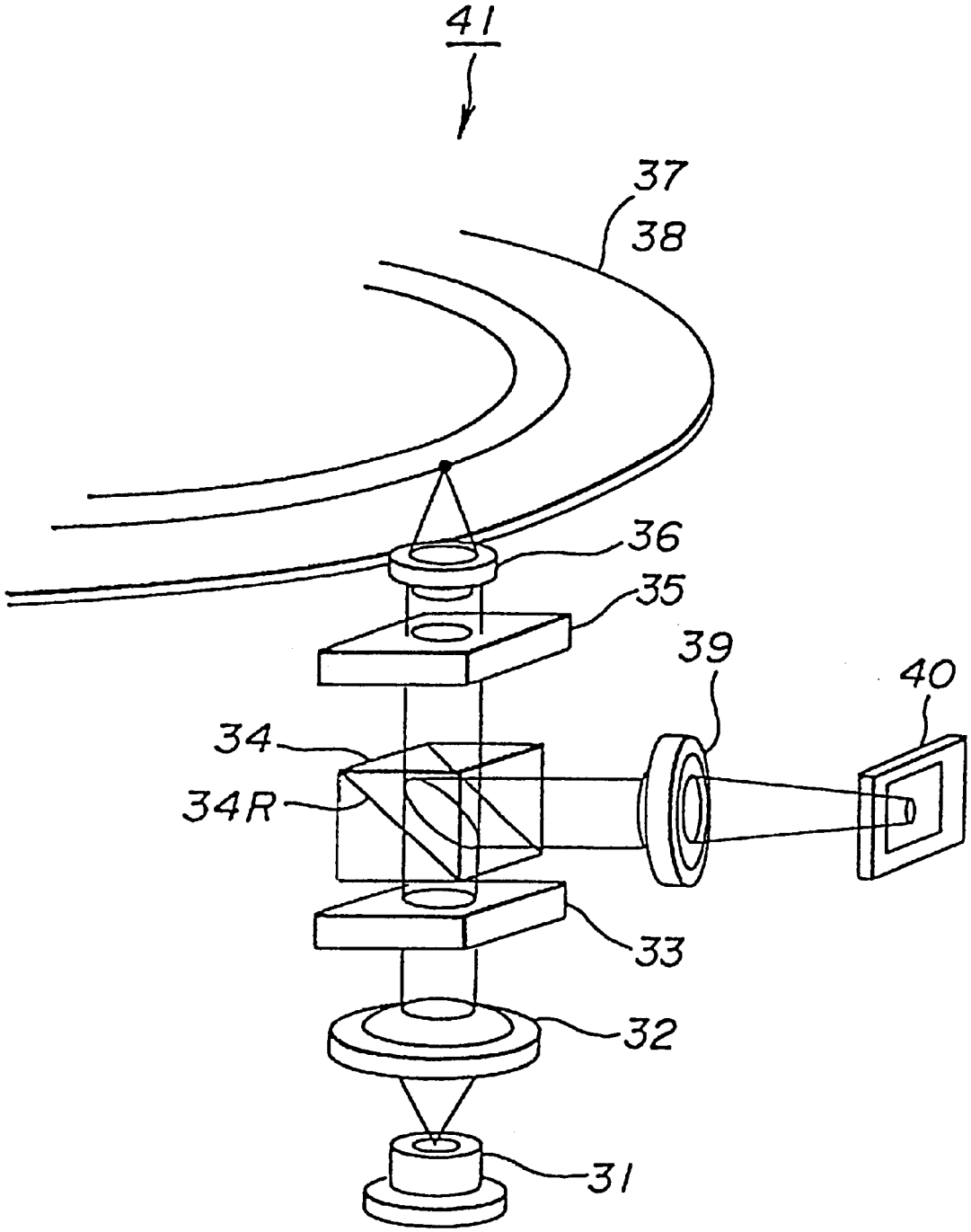
FIG. 15 is a schematic view of an optical pickup device according to a third embodiment of the present invention.

The third embodiment is explained by referring to FIG. 15. The present third embodiment is similarly directed to an optical pickup device 41 configured for reproducing information signals from an optical disc 37 with a substrate thickness of 0.6 mm and an optical disc 38 with a substrate thickness of 1.2 mm. The optical pickup device includes a laser diode 31 for radiating the playback laser light to the optical discs 37 and 38 and an objective lens 36 for condensing the playback laser light from the laser diode 31 on the signal recording surfaces (information surfaces) of the optical discs 37 and 38. The optical pickup device also includes an aperture varying mechanism 35 for setting the numerical aperture NA of the objective lens 36 for the optical disc 37 with the substrate thickness of 0.6 mm and the numerical aperture $NA_o$ for the optical disc 38 with the substrate thickness of 1.2 mm to 0.6 and to $(0.45/0.78)\times\lambda_o$, respectively, where $\lambda_o$ denotes a numerical value equal to the wavelength of the laser light radiated from the laser diode 31 in $\mu$m, and a photodetector 40 for detecting the return light from the optical discs 37, 38. The aperture varying mechanism 35 is arranged between the objective lens 36 and the laser diode 31.

With the optical pickup device 41, the laser light radiated from the laser diode 31 is collimated by a collimator lens 32 and split by a diffraction lattice 33 into three beams, that is a 0'th order light beam and ±1st order light beams. These three beams are conducted via a beam splitter 34 and an aperture varying mechanism 35 to an objective lens 36 so as to be condensed thereby on the recording surfaces of the optical discs 37, 38. The return light from the signal recording surfaces of the optical discs 37, 38 falls on the beam splitter 34 via the objective lens 36 and the aperture varying mechanism 35. The beam splitter 34 reflects part of the return light by a reflective surface 34R towards a multi-lens 39 which causes the return light to fall on the photodetector 40. The photodetector converts the light volume of the return light into electrical signals. Thus, with the present optical pickup device 41, servo signals and RF signals are produced. Meanwhile, the objective lens 36 of the optical pickup device 41 of the present third embodiment is an infinite multiplication factor lens.

The laser light from the laser diode 31 transmitted from the beam splitter 34 falls on the objective lens through the aperture varying mechanism 35, as described above.

The aperture varying mechanism 35 arranged between the laser objective lens 36 and the laser diode 31 is such an aperture varying means capable of changing the size of the aperture depending upon the substrate thickness of the optical discs 37 and 38 and consequently changing the numerical aperture of the objective lens 36.

Similarly to the optical pickup device of the first and second embodiments, the optical pickup device 41 is capable of discriminating the difference in the substrate thickness of the optical disc 37 with the substrate thickness of 0.6 mm and the optical disc 38 with the substrate thickness of 1.2 mm by substrate thickness detection means not shown. The substrate thickness detection means is not explained in detail. The description of the operating principle and the detailed mechanism of the aperture varying mechanism 35 of the optical pickup device 41 has been made above and hence is not made for simplicity.

With the optical pickup device 41 of the third embodiment, satisfactory reproduction may be expected from the optical disc 37 having the disc substrate thickness $t_1$=0.6 mm and the optical disc 38 having the disc substrate thickness $t_2$=1.2 mm.

Figure 16:
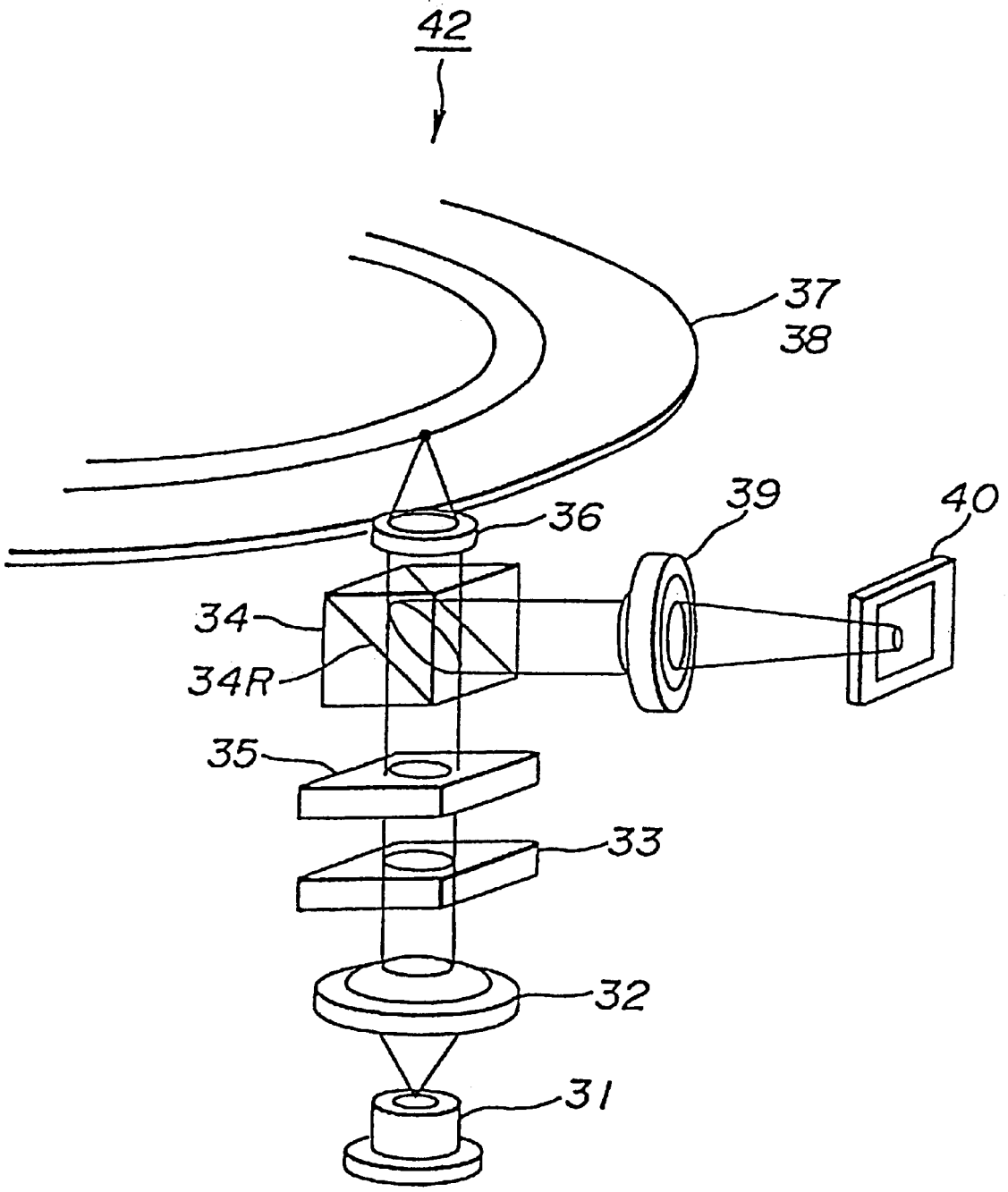
FIG. 16 is a schematic view of an optical pickup device according to a fourth embodiment of the present invention.

The fourth embodiment is explained by referring to FIG. 16. The present fourth embodiment is similarly directed to an optical pickup device 42 configured for reproducing information signals from the optical disc 37 with a substrate thickness of 0.6 mm and the optical disc 38 with a substrate thickness of 1.2 mm. The optical pickup device includes a laser diode 31 for radiating the playback laser light to the optical discs and an objective lens 36 for condensing the playback laser light from the laser diode 31 on the signal recording surfaces (information surfaces) of the optical discs 37 and 38. The optical pickup device also includes an aperture varying mechanism 35 for setting the numerical aperture NA of the objective lens 36 for the optical disc 37 with the substrate thickness of 0.6 mm and the numerical aperture $NA_o$ for the optical disc 38 with the substrate thickness of 1.2 mm to 0.6 and to $(0.45/0.78)\times\lambda_o$, respectively, where $\lambda_o$ denotes a numerical value equal to the wavelength of the laser light radiated from the laser diode 31 in $\mu$m, and a photodetector 40 for detecting the return light from the optical discs 37, 38. The aperture varying mechanism 35 is arranged between the objective lens 36 and the laser diode 31.

With the optical pickup device 42, the laser light radiated from the laser diode 31 is collimated by a collimator lens 32 and split by a diffraction lattice 33 into three beams, that is a 0'th order light beam and ±1st order light beams. These three beams are conducted via a beam splitter 34 and an aperture varying mechanism 35 to an objective lens 36 so as to be condensed thereby on the recording surfaces of the optical discs 37, 38. The return light from the signal recording surfaces of the optical discs 37, 38 falls on the beam splitter 34 via the objective lens 36. The beam splitter 34 reflects part of the return light by a reflective surface 34R towards a multi-lens 39 which causes the return light to fall on the photodetector 40. The photodetector converts the light volume of the return light into electrical signals. Thus, with the present optical pickup device 42, servo signals and RF signals are produced. Meanwhile, the objective lens 36 of the optical pickup device 42 of the present first embodiment is of a simplified construction of an infinite multiplication factor objective lens.

The laser light from the laser diode 31 is passed through the collimator lens 32, diffraction lattice 33 and the aperture varying mechanism 35 in this order so as to fall on the objective lens 36 via the beam splitter 34, as described above.

The aperture varying mechanism 35 arranged between the diffraction lattice 33 and the beam splitter 34 is such an aperture varying means capable of changing the size of the aperture depending upon the substrate thickness of the optical discs 37 and 38 and consequently changing the numerical aperture of the objective lens 36.

Similarly to the optical pickup devices of the first to third embodiments, the optical pickup device 42 is capable of discriminating the difference in the substrate thickness of the optical disc with the substrate thickness of 0.6 mm and the optical disc with the substrate thickness of 1.2 mm by substrate thickness detection means, not shown. The substrate thickness detection means is not explained in detail. The description of the operating principle and the detailed mechanism of the optical pickup device 42 has been made above and hence is not made for simplicity.

With the optical pickup device 42 of the fourth embodiment, satisfactory reproduction may be expected from the optical disc 37 having the disc substrate thickness $t_1$=0.6 mm and the optical disc 38 having the disc substrate thickness $t_2$=1.2 mm.

Figure 17:
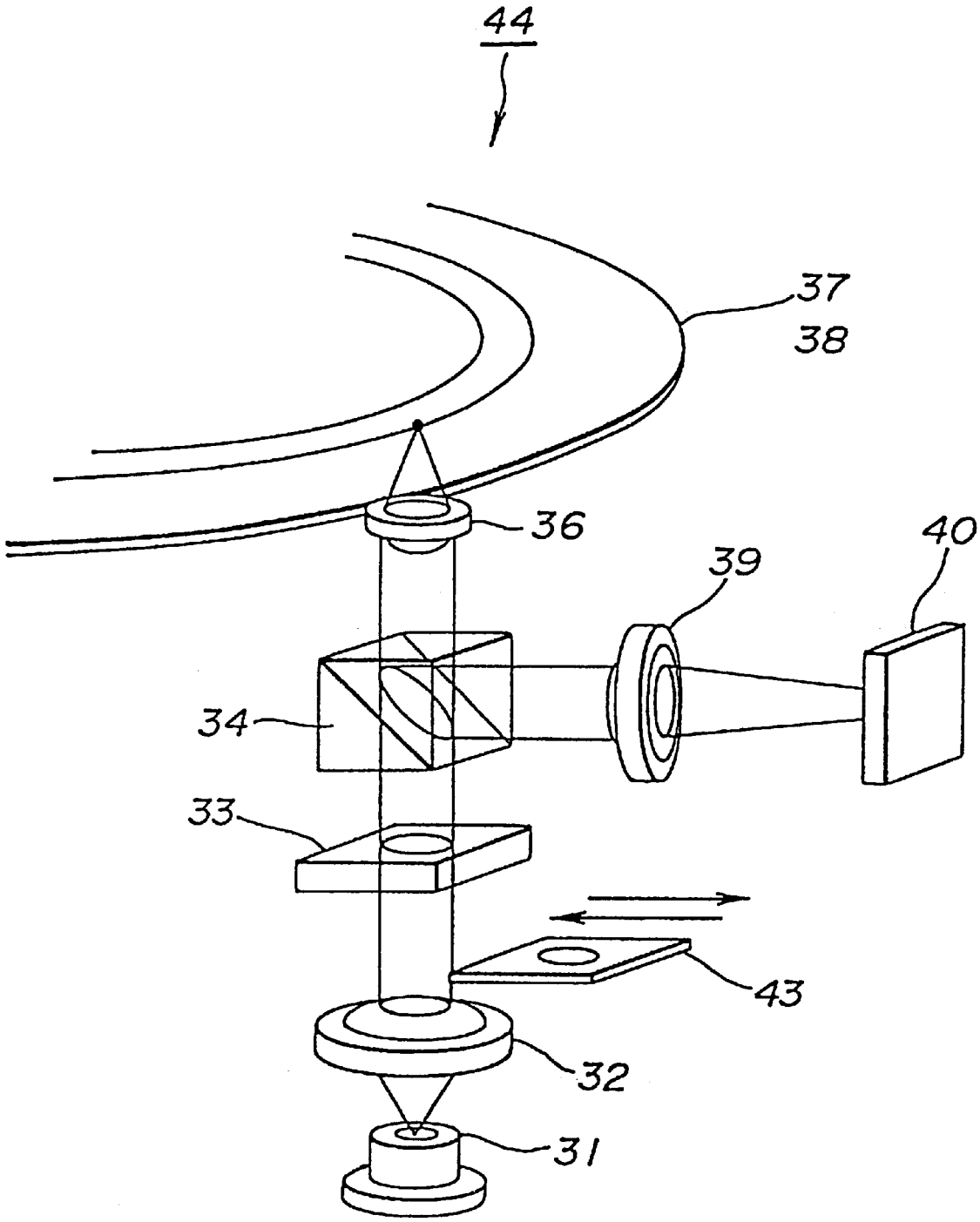
FIG. 17 is a schematic view of an optical pickup device according to a fifth embodiment of the present invention.

A fifth embodiment is explained by referring to FIG. 17. The present fifth embodiment is similarly directed to an optical pickup device 44 configured for reproducing information signals from an optical disc 37 with a substrate thickness of 0.6 mm and an optical disc 38 with a substrate thickness of 1.2 mm. The optical pickup device includes a laser diode 31 for radiating the playback laser light to the optical discs 37 and 38 and an objective lens 36 for condensing the playback laser light from the laser diode 31 on the signal recording surfaces (information surfaces) of the optical discs 37 and 38. The optical pickup device also includes an aperture varying mechanism 43 for setting the numerical aperture NA of the objective lens 36 for the optical disc 37 with the substrate thickness of 0.6 mm and the numerical aperture $NA_o$ of the objective lens 36 for the optical disc 38 with the substrate thickness of 1.2 mm to 0.6 and to $(0.45/0.78)\times\lambda_o$, respectively, where $\lambda_o$ denotes a numerical value equal to the wavelength of the laser light radiated from the laser diode 31 in $\mu$m, and a photodetector 40 for detecting the return light from the optical discs 37, 38.

With the present fifth embodiment, the aperture varying mechanism 43 is arranged between the objective lens 36 and the laser diode 31, specifically, between the collimator lens 32 and the diffraction lattice 33. In addition, the aperture varying mechanism is configured for being introduced into and extracted from the opening portion of the collimator lens 32.

With the optical pickup device 44, the laser light radiated from the laser diode 31 is collimated by the collimator lens 32 and transmitted through the aperture varying mechanism 43 so as to be split by a diffraction lattice 33 into three beams, that is a 0'th order light beam and ±1st order light beams. These three beams are conducted via a beam splitter 34 to the objective lens 36 so as to be condensed thereby on the recording surfaces of the optical discs 37, 38. The return light from the signal recording surfaces of the optical discs 37, 38 falls on the beam splitter 34 via the objective lens 36. The beam splitter 34 reflects part of the return light by a reflective surface 34R towards a multi-lens 39 which causes the return light to fall on the photodetector 40. The photodetector converts the light volume of the return light into electrical signals. Thus, with the present optical pickup device 44, servo signals and RF signals are produced. Meanwhile, the objective lens 36 of the optical pickup device 44 is an infinite multiplication factor objective lens.

The laser light from the laser diode 31 is transmitted through the collimator lens 32, the aperture varying mechanism 43 that can be introduced into and extracted from the opening portion of the objective collimator lens 32 and the diffraction lattice 33, in this order, before being incident on the objective lens 36 via the beam splitter 34.

The aperture varying mechanism 43 arranged between the collimator lens 32 and the diffraction lattice 33 is such an aperture varying means capable of changing the size of the aperture depending upon the substrate thickness of the optical discs and consequently changing the numerical aperture of the objective lens 36.

Similarly to the optical pickup devices of the first to third embodiments, the optical pickup device 44 is capable of discriminating the difference in the substrate thickness of the optical disc with the substrate thickness of 0.6 mm and the optical disc with the substrate thickness of 1.2 mm by substrate thickness detection means, which is not shown and is not explained in detail for simplicity.

With the optical pickup device 44 of the fifth embodiment, satisfactory reproduction may be expected from the optical disc 37 having the disc substrate thickness $t_1$=0.6 mm and the optical disc 38 having the disc substrate thickness $t_2$=1.2 mm.

The optical pickup device according to the present invention is not limited to the above-described embodiments. Thus the optical pickup device according to the present invention may be employed for reproducing an optical disc having a substrate thickness of 0.8 mm and an optical disc having a substrate thickness of 1.2 mm. Such optical pickup device is explained by referring to FIGS. 18 and 19. The overall construction is similar to that shown in FIG. 2 and hence is not explained specifically.

Figure 18:
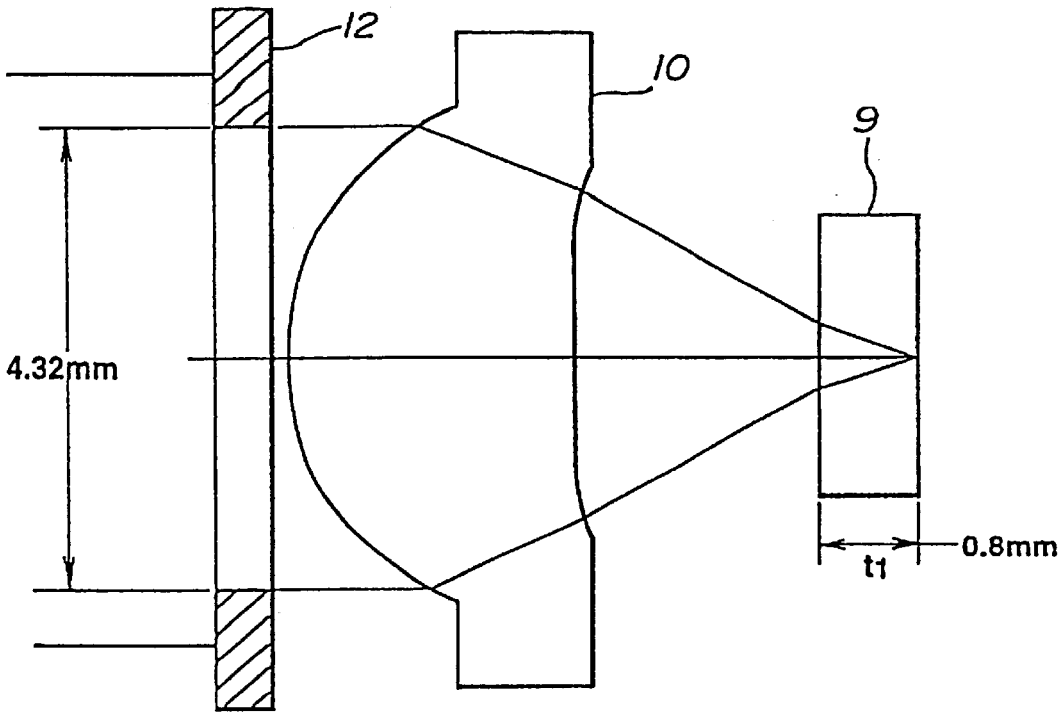
FIG. 18 is a schematic view of an optical pickup device according to a sixth embodiment of the present invention.
Figure 19:
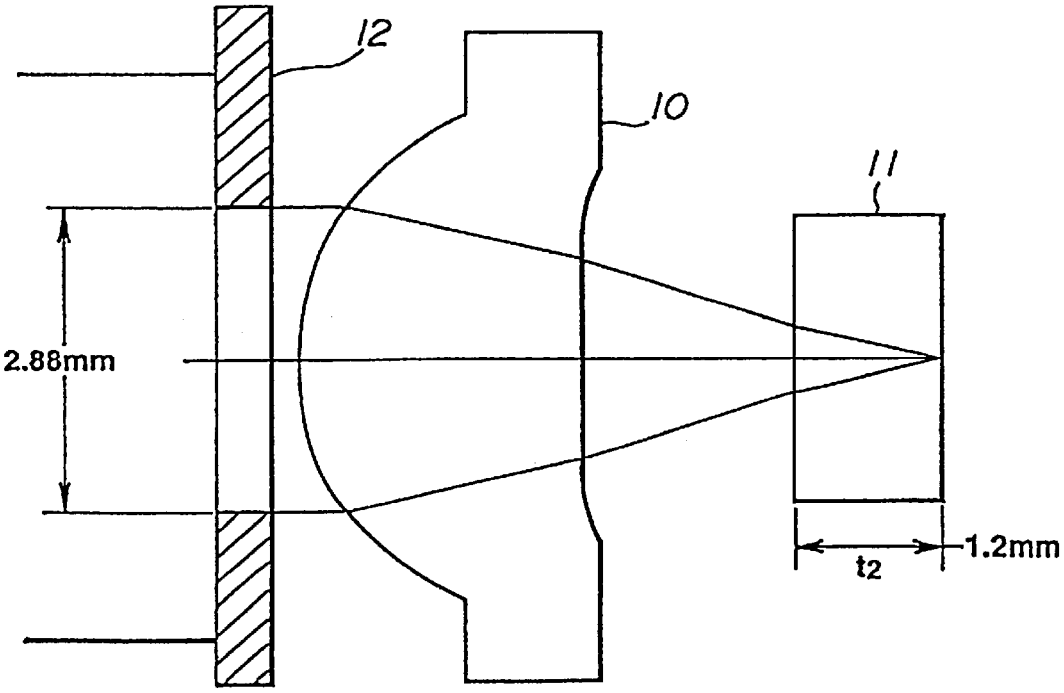
FIG. 19 illustrates the operation of reproducing an optical disc with a substrate thickness of 1.2 mm with an optical pickup device shown in FIG. 18.

The present sixth embodiment is directed to an optical pickup device capable of reproducing information signals from an optical disc 9 having a substrate thickness $t_1$ of 0.8 mm as shown in FIG. 18 and an optical disc 11 having a substrate thickness $t_2$ of 1.2 mm as shown in FIG. 19.

For reproducing information signals from the optical disc 9 with a substrate thickness $t_1$ of 0.8 mm, the light stop of the aperture varying mechanism 12 and the aperture diameter of the objective lens 10 are set to 4.32 mm and to 4.32, respectively, for setting the numerical aperture of the objective lens 10 to 0.6. On the other hand, for reproducing information signals from the optical disc 11 with a substrate thickness $t_2$ of 1.2 mm, the light stop of the aperture varying mechanism 12 and the aperture diameter of the objective lens 10 are set to 2.88 mm and to 2.88, respectively, for setting the numerical aperture of the objective lens 10 to 0.4. At this time, the laser light having the wavelength of 680 nm is radiated from the laser diode so that the focal length will be 3.6 mm.

Evaluation of the operation of the optical pickup device of the sixth embodiment is done with the Marechal criterion of 0.07 rmsλ as a reference.

The objective lens 10 has the following lens dimensions. The lens dimensions are given in the order of the radius of curvature, spacing and the refractive index according to respective planes. The spacings and the radius of curvature of the object planes are both infinite (∞).

The radius of curvature, spacing and the refractive index of the first plane are 2.4082, 2.460000 and 1.585352, respectively. The non-spherical coefficients of the first plane shown in the equation (5) are k=−0.153983, A=−0.474540E−03, B=0.0000000E−04, C=0.000000E+00 and D=0.000000E+00.

The radius of curvature and the spacing of the second plane are −10.48584 and 2.03311, respectively. The non-spherical coefficients of the second plane shown in the equation (5) are k=−0.17298E09, A=0.16670284E−01, B=0.000000E+00, C=0.000000E+00 and D=0.000000E+00.

As to the lens design specifications, the numerical aperture NA is 0.60000, the wavelength is 680.00 nm, the focal lengths is 3.6, and an image height is 0.05000 mm, for the substrate thickness $t_1$=0.8 mm, whereas, for the substrate thickness $t_1$=1.2 mm, the numerical aperture NA is 0.40000, the wavelength is 680.00 nm, the focal length is 3.6, and an image height is 0.05000 mm.

Figure 20A:
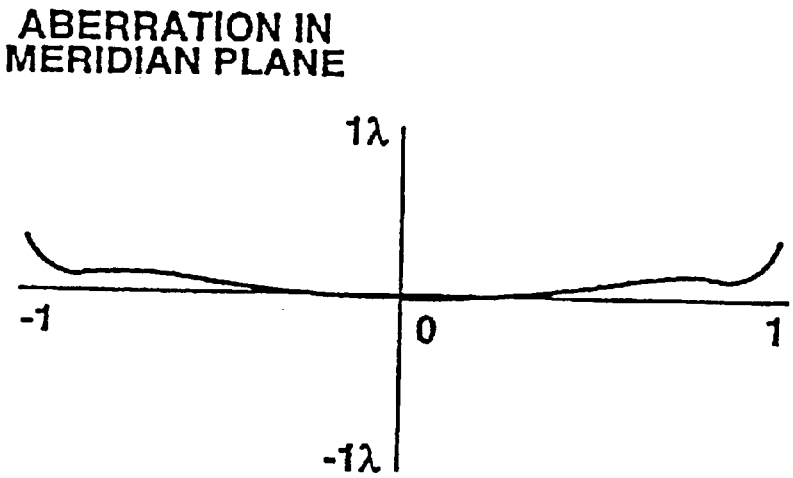
FIGS. 20A and 20B illustrate on-axis wavefront aberration in case of reproduction of information signals from a disc having a disc substrate thickness of 0.6 mm by the optical pickup device shown in FIG. 18.
Figure 20B:
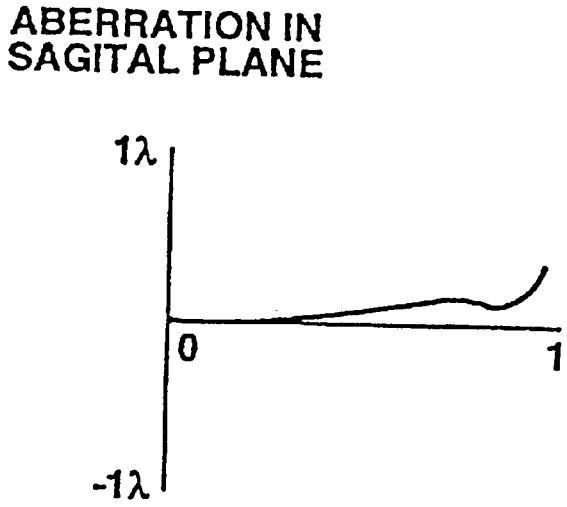
Figure 21A:
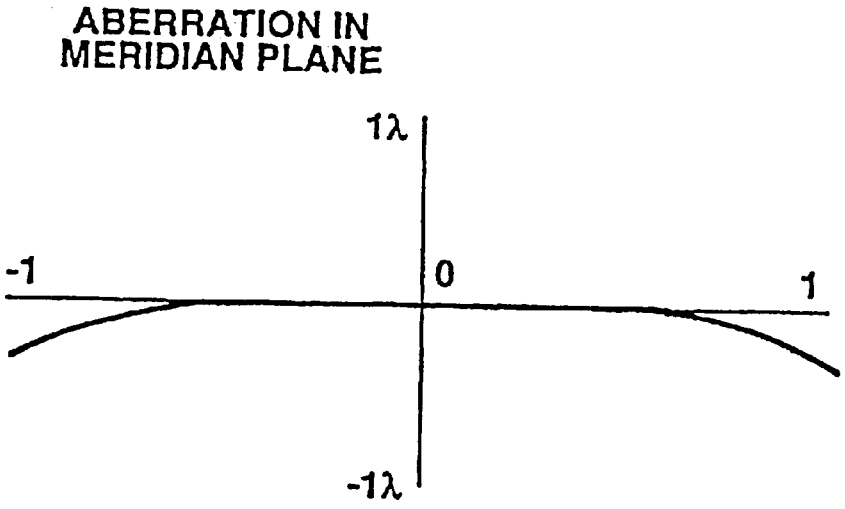
FIGS. 21A and 21B illustrate on-axis wavefront aberration in case of reproduction of information signals from a disc having a disc substrate thickness of 1.2 mm by the optical pickup device shown in FIG. 18.
Figure 21B:
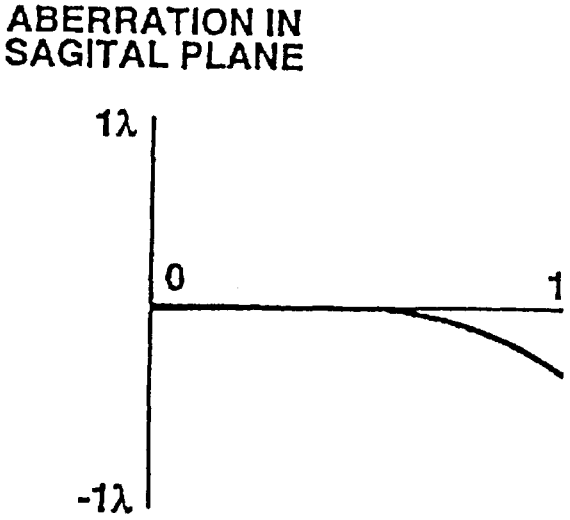

The on-axis wavefront aberration is shown in FIGS. 20A, 20B, 21A and 21B. FIG. 20A shows changes in the aberration in the meridinal image surface with respect to changes in the diameter of the pupil of the objective lens 10 for the disc substrate thickness $t_1$=0.8 mm and the numerical aperture of the objective lens of 0.6. FIG. 20B shows changes in the aberration in the sagittal image surface with respect to changes in diameter of the pupil of the objective lens 10. FIG. 21A shows changes in the aberration in the meridinal image surface with respect to changes in the diameter of the pupil of the objective lens 10 for the disc substrate thickness $t_2$=1.2 mm and the numerical aperture of the objective lens of 0.4. FIG. 21B shows changes in the aberration in the sagittal image surface with respect to changes in diameter of the pupil of the objective lens 20. The on-axis aberration of the optical system is 0.023 rmsλ and 0.029 rmsλ for the disc substrate thickness $t_1$=0.8 mm and the numerical aperture of the objective lens of 0.6 and for the disc substrate thickness $t_2$=1.2 mm and the numerical aperture of the objective lens of 0.4, respectively. In both of these cases, the Marechal criterion was not higher than 0.07 rmsλ.. Thus, with the sixth embodiment, high-quality reproduction may be achieved with the two sorts of the optical discs, that is the disc 9 with the disc substrate thickness $t_1$=0.6 mm and the optical disc 11 with the disc substrate thickness $t_2$=1.2 mm.

The aperture varying mechanism employed in the above-described first to sixth embodiments may be configured as shown in FIGS. 22A, 22B, 23 and 24, instead of being configured as shown in FIG. 5.

Figure 22A:
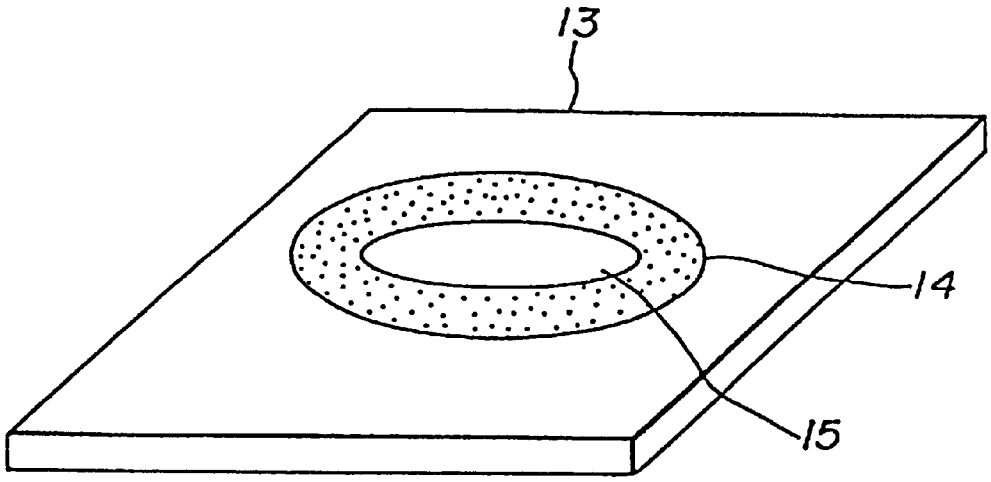
FIGS. 22A, 22B illustrate the construction of the aperture varying mechanism configured for varying the aperture size using a liquid crystal shutter.
Figure 22B:
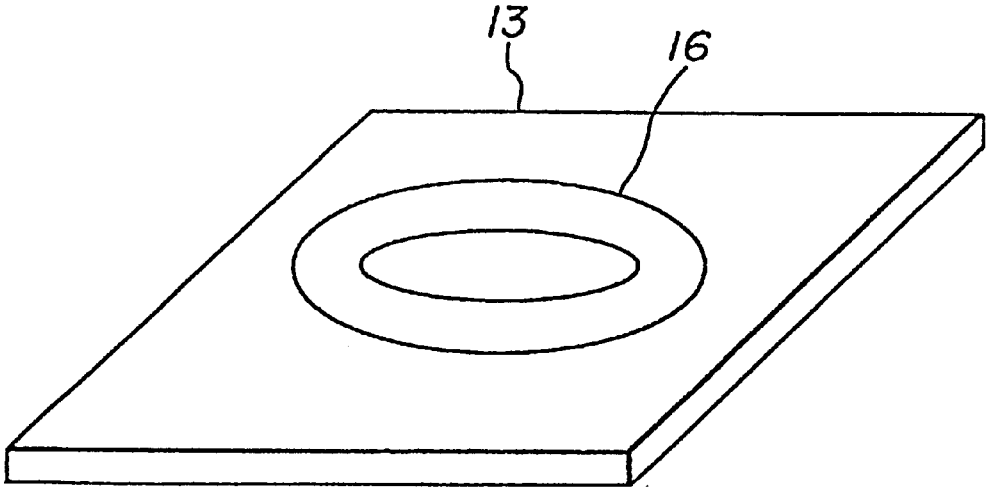

The aperture varying mechanism 13 shown in FIGS. 22A and 22B varies the aperture size using a liquid crystal shutter portion 14. FIG. 22A represents the state in which the liquid crystal shutter portion 14 is closed for realizing a small-sized aperture 15. FIG. 22B represents the state in which the liquid crystal shutter portion 14 is opened for realizing a large-sized aperture 16.

Figure 23:
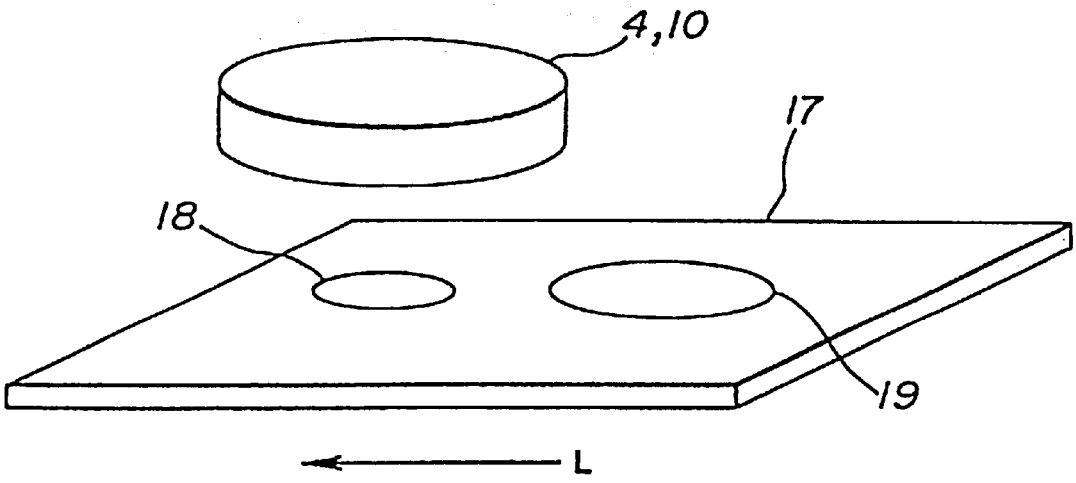
FIG. 23 illustrates the construction of the aperture varying mechanism configured for varying the aperture size by moving a plate provided with plural apertures.

An aperture varying mechanism 17 shown in FIG. 23 varies the aperture size by changing over the aperture portions by moving the disc inherently formed with a small aperture 18 and a large aperture 19 in the direction shown by arrow L.

Figure 24:
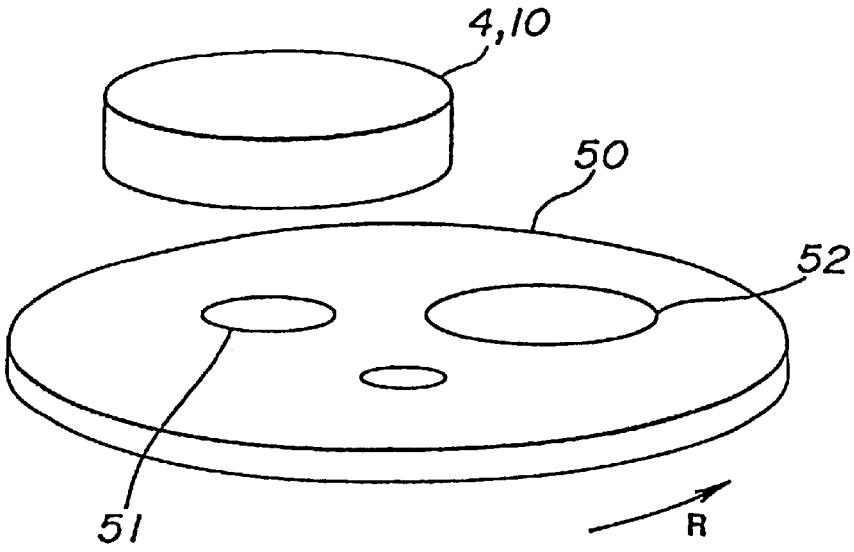
FIG. 24 illustrates the construction of the aperture varying mechanism configured for varying the aperture size by moving a disc provided with plural apertures.

An aperture varying mechanism 50 shown in FIG. 24 varies the aperture size by changing over the aperture portions by rotating the disc inherently formed with a small aperture 51 and a large aperture 52 in the direction shown by arrow R.

Figure 25:
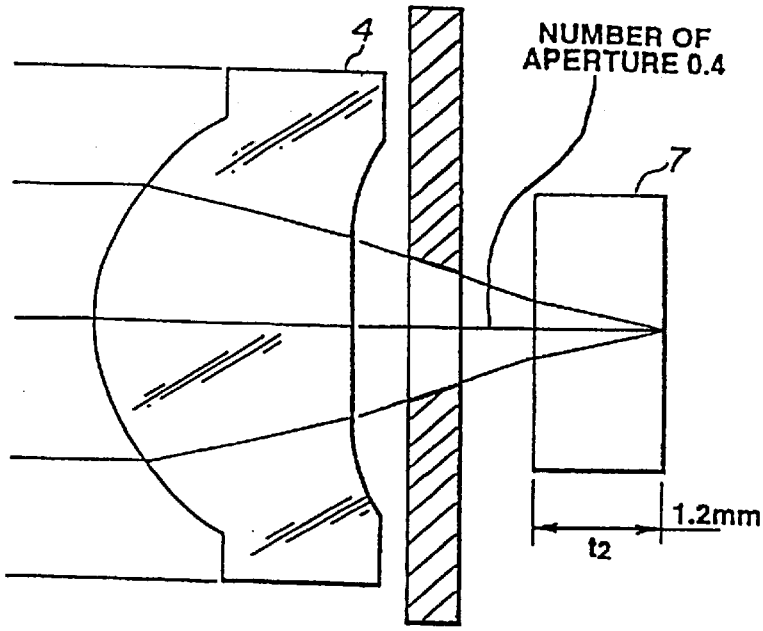
FIG. 25 is a section view of an optical pickup device having an aperture varying mechanism positioned between an objective lens and a optical disk recording medium.

The aperture varying means for varying the size of the aperture of the objective lens depending upon the thickness of the optical recording medium may be arranged between the objective lens and the light source (e.g., as shown in FIG. 4), or between the objective lens and the optical recording medium, as shown in FIG. 25.

Figure 26:
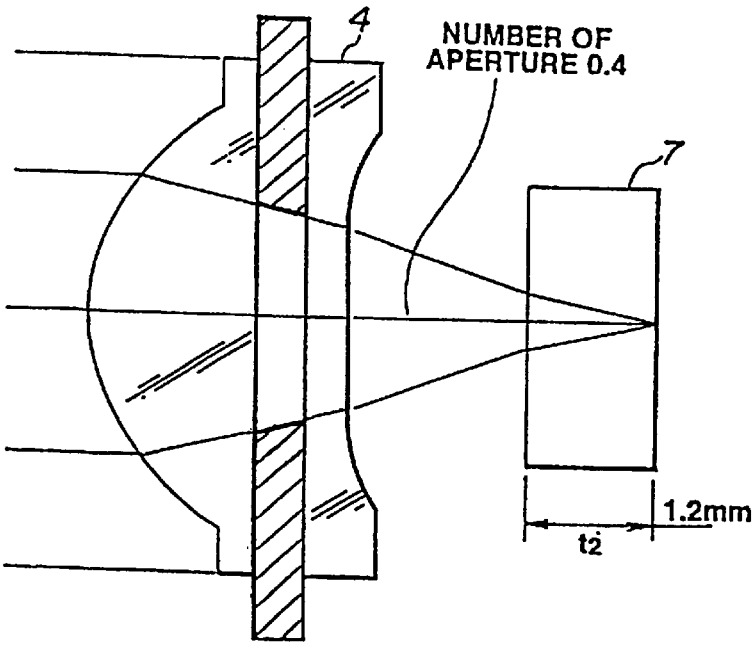
FIG. 26 is a section view of an optical pickup device having an aperture varying mechanism arranged within the objective lens.
Figure 27:
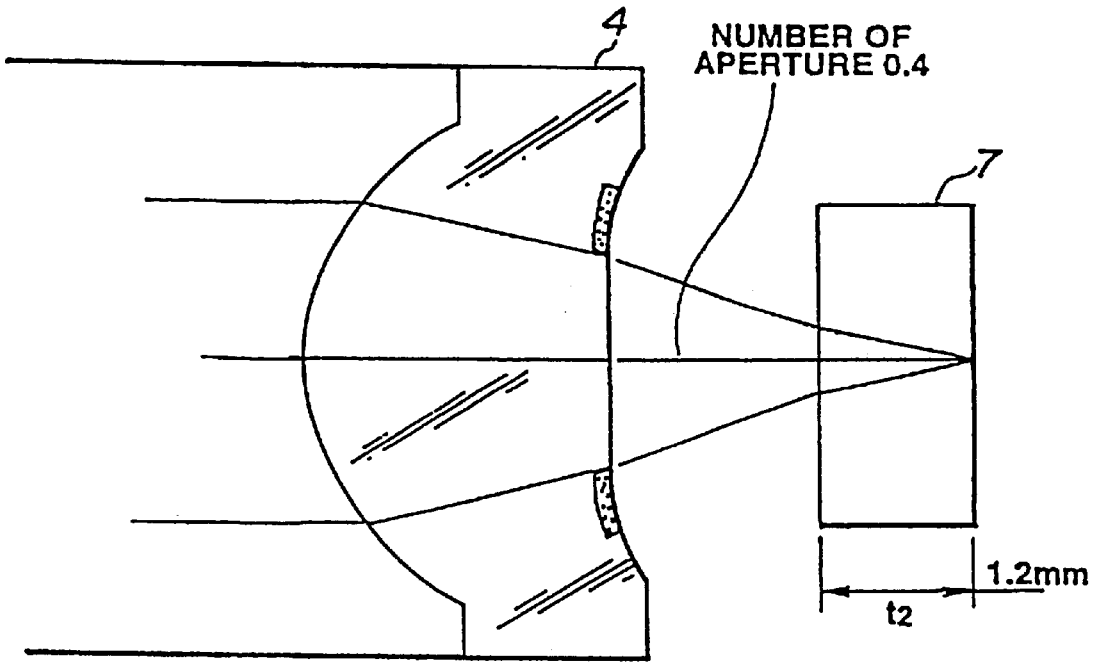
FIG. 27 is a section view of an optical pickup device having an aperture varying mechanism arranged on a surface of the objective lens.

The aperture varying mechanism may be provided on the surfaces or within the inside of the objective lenses 4 and 10. For example, FIG. 26 shows an optical pickup device having an aperture varying mechanism arranged within the objective lens 4, and FIG. 27 shows an optical pickup device having an aperture varying mechanism arranged on a surface of the objective lens 4.

The optical pickup device according to the present invention may be applied in recording information signals on the optical disc.

What is claimed is:

1. An optical pickup device capable of recording and/or reproducing at least two different sorts of optical recording media, comprising:

a light source radiating a light beam;

an objective lens for condensing the light from said light source;

substrate thickness detection means for detecting a thickness of a substrate of the optical recording medium;

aperture varying means for varying the size of an aperture of said objective lens depending upon an output signal from said substrate thickness detection means; and light detection means for detecting the return light from said optical recording medium.

2. The optical pickup device as claimed in claim 1, wherein said optical recording media are an optical recording medium having a substrate thickness of 0.6 mm and an optical recording medium having a substrate thickness of 1.2 mm and wherein said aperture varying means sets a numerical aperture NA of said objective lens with respect to the optical recording medium having a substrate thickness of 0.6 mm to 0.6, while setting a numerical aperture $NA_o$ of said objective lens with respect to the optical recording medium having a substrate thickness of 1.2 mm to:

$$NA_o \leqq (0.45/0.78) \times \lambda_o$$

where $NA_o$ is a numerical aperture of said objective lens with respect to said optical recording medium having the substrate thickness of 1.2 mm and $\lambda_o$ is a numerical value equal to the wavelength in $\mu$m of light radiated from said light source.

3. The optical pickup device as claimed in claim 1 wherein said aperture varying means is arranged between said objective lens and said light source.

4. The optical pickup device as claimed in claim 1 wherein said aperture varying means is arranged between said objective lens and said optical recording medium.

5. The optical pickup device as claimed in claim 1 wherein said aperture varying means is arranged on the surface of said objective lens.

6. The optical pickup device as claimed in claim 1 wherein said aperture varying means is arranged within the inside of said objective lens.

7. The optical pickup device as claimed in claim 1 wherein said aperture varying means varies the aperture size by rotating respective blades of a light stop mechanism having a plurality of blades.

8. The optical pickup device as claimed in claim 1 wherein said aperture varying means varies the aperture size using a liquid crystal shutter.

9. The optical pickup device as claimed in claim 1 wherein said aperture varying means varies the aperture size by moving a plate having plural openings for changing over said openings.

*10. An optical pickup device capable of recording and/or reproducing optical recording media, comprising:*

*a light source radiating a light beam;*

*an objective lens for condensing the light from said light source;*

*a liquid crystal shutter arranged in an optical path between the light source and said objective lens, which is operative to electrically change at least a size of a light beam passing said liquid crystal shutter;*

*a substrate thickness detection means for detecting a substrate thickness of the optical recording media which is loaded; and*

*liquid crystal control means for controlling said liquid control shutter to minimize the wave front aberration of a beam spot converged onto said optical recording media in accordance with the result of the substrate thickness detection means.*

*11. The optical pickup device as claimed in claim 10, further comprising light detection means for detecting a return light from said optical recording media, and said substrate thickness detection means detects a difference in substrate thickness using RF or servo signals detected by said light detection means.*

*12. The optical pickup device as claimed in claim 10, wherein the substrate thickness detection means detects a difference in substrate thickness using information regarding substrate thickness recorded on said optical recording media.*

*13. A wave front aberration compensating apparatus for an optical data recording and reproducing apparatus to correct a wavefront aberration of light emitted from a light source and converged onto a data recording medium through an image forming optical system, said apparatus comprising:*

*a liquid crystal shutter arranged in an optical path between the light source and said data recording medium, which is operative to electrically change at least a size of a light beam passing said liquid crystal shutter;*

*a substrate thickness detection means for detecting a substrate thickness of the data recording medium which is loaded; and*

*liquid crystal control means for controlling the liquid crystal shutter to minimize the wave front aberration of a beam spot converged onto said data recording medium in accordance with the result of the substrate thickness detection means.*

*14. The wave front aberration compensating apparatus as claimed in claim 13, further comprising light detection means for detecting a return light from said data recording medium, and said substrate thickness detection means detects a difference in substrate thickness using RF or servo signals detected by the light detection means.*

*15. The wave front aberration compensating apparatus as claimed in claim 13, wherein the substrate thickness detection means detects the difference in substrate thickness using information regarding substrate thickness recorded on the data recording medium.*

* * * * *